United States Patent
Pattan et al.

(10) Patent No.: US 9,633,365 B1
(45) Date of Patent: Apr. 25, 2017

(54) METHOD, APPARATUS, AND COMPUTER-READABLE MEDIUM FOR SERVING DETAILED SOCIAL ANNOTATIONS

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 771 days.

(21) Appl. No.: 13/244,804

(22) Filed: Sep. 26, 2011

Related U.S. Application Data

(63) Continuation of application No. 13/239,081, filed on Sep. 21, 2011, now abandoned.

(51) Int. Cl.
G06Q 30/00 (2012.01)
G06Q 30/02 (2012.01)

(52) U.S. Cl.
CPC ..... G06Q 30/0241 (2013.01); G06Q 30/0242 (2013.01)

(58) Field of Classification Search
USPC .......................................................... 705/14
See application file for complete search history.

(56) References Cited

U.S. PATENT DOCUMENTS

| | | | |
|---|---|---|---|
| 6,925,458 B2 | 8/2005 | Scaturro et al. |
| 7,218,941 B1 | 5/2007 | Kubo et al. |
| 7,669,123 B2 | 2/2010 | Zuckerberg et al. |
| 7,672,953 B2 | 3/2010 | McAniff et al. |
| 7,725,565 B2 | 5/2010 | Li et al. |
| 7,739,304 B2 | 6/2010 | Naaman et al. |
| 7,756,756 B1 | 7/2010 | Lifson |
| 7,756,926 B2 | 7/2010 | Tseng et al. |
| 7,788,247 B2 | 8/2010 | Wang et al. |
| 7,827,208 B2 | 11/2010 | Bosworth et al. |
| 7,844,604 B2 | 11/2010 | Baio et al. |
| 7,885,986 B2 | 2/2011 | Anderson et al. |
| 7,890,501 B2 | 2/2011 | Lunt et al. |
| 7,890,874 B2 | 2/2011 | Kaufman |
| 7,895,177 B2 | 2/2011 | Wu |
| 7,945,482 B2 | 5/2011 | Law et al. |
| 7,958,192 B2 | 6/2011 | Harik et al. |
| 7,970,825 B2 | 6/2011 | Lunenfeld |

(Continued)

OTHER PUBLICATIONS

The Facebook EdgeRank Algorithm, Blog, Aug. 23, 2011, pp. 1-3.*
Richardson, Kailei, Best Practices: Using Facebook Effectively in your Marketing Mix (Part 2), Mar 31, 2011, p. 2.*

Primary Examiner — Alvin L Brown
(74) Attorney, Agent, or Firm — Fish & Richardson P.C.

(57) ABSTRACT

Methods, apparatuses, and computer-readable media for serving detailed annotations is disclosed. When a user converts in response to an advertisement, data about the conversion is stored in one or more logs. A batch handler uses the one or more logs to create and enter a record regarding the conversion into a conversion table. Upon receiving an ad request from a client, ads scorer may construct a detailed annotation using the conversion table and a social graph table, and ads server may return an ad and the detailed annotation. Ads server may also return an ad plus an iframe. The iframe requests a detailed annotation from a conversion management server. The conversion management server constructs and returns the detailed annotation.

27 Claims, 20 Drawing Sheets

(56) References Cited

U.S. PATENT DOCUMENTS

| | | |
|---|---|---|
| 7,970,912 B2 | 6/2011 | Bourne |
| 7,974,889 B2 | 7/2011 | Raimbeault |
| 7,983,927 B2 | 7/2011 | McGill et al. |
| 7,987,198 B2 | 7/2011 | Armstrong et al. |
| 7,992,171 B2 | 8/2011 | Amidon et al. |
| 2007/0027768 A1* | 2/2007 | Collins et al. ............... 705/14 |
| 2007/0168206 A1* | 7/2007 | McCall et al. .................. 705/1 |
| 2009/0070228 A1 | 3/2009 | Ronen |
| 2009/0235176 A1 | 9/2009 | Jayanthi |
| 2009/0274384 A1* | 11/2009 | Jakobovits ................. 382/254 |
| 2011/0131147 A1 | 6/2011 | Lee et al. |
| 2011/0145719 A1 | 6/2011 | Chen et al. |
| 2011/0166928 A1 | 7/2011 | Robinson et al. |
| 2011/0184926 A1 | 7/2011 | Lee et al. |
| 2011/0184960 A1 | 7/2011 | Delpha et al. |
| 2011/0231240 A1* | 9/2011 | Schoen et al. ........... 705/14.41 |
| 2012/0084160 A1* | 4/2012 | Badros et al. ........... 705/14.73 |
| 2012/0166267 A1* | 6/2012 | Beatty et al. ............ 705/14.21 |

* cited by examiner

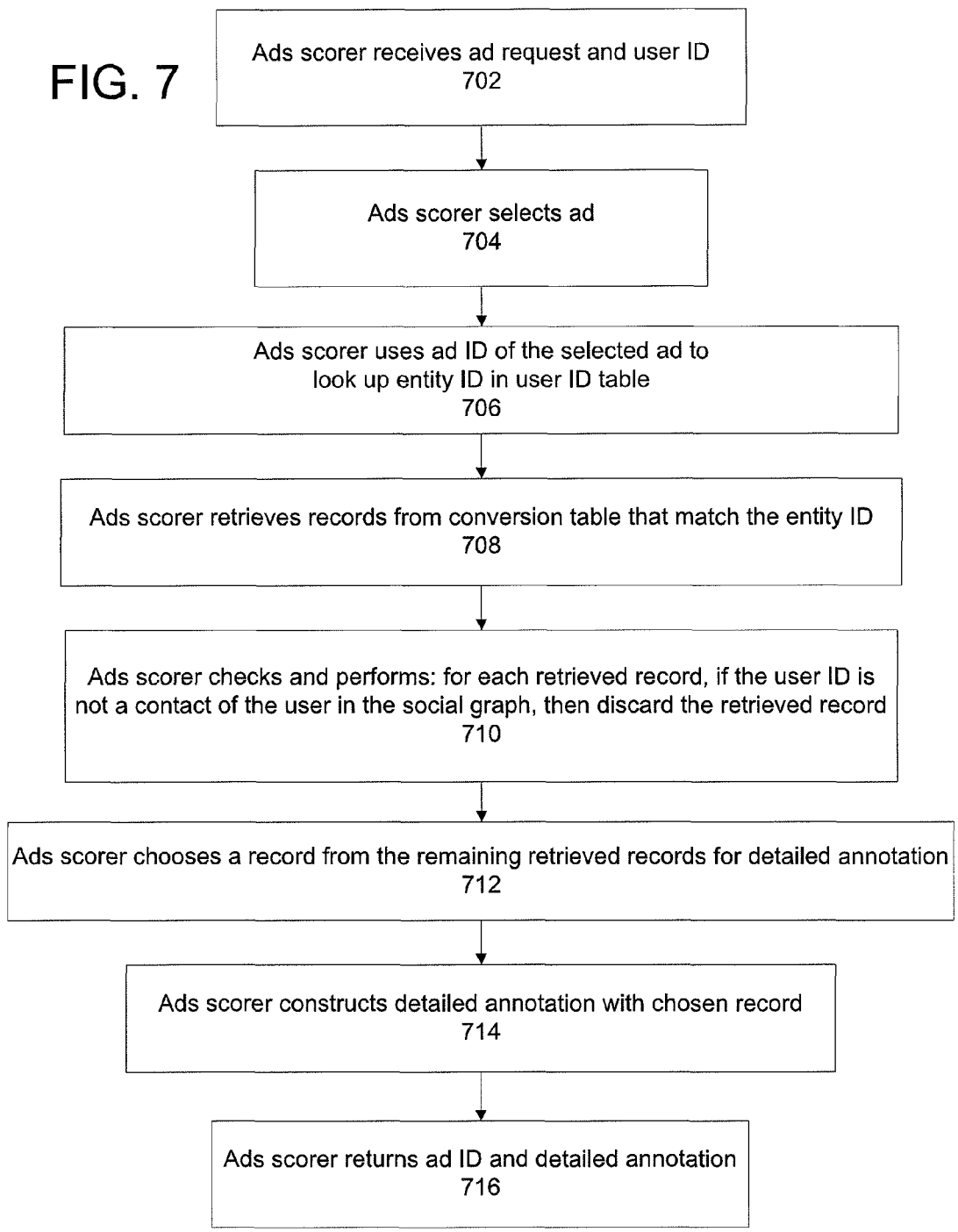

FIG. 10    CONVERSION TABLE

| Entity ID | User ID | Action | Timestamp | Location |
|---|---|---|---|---|
| Virtual Bowling | 4444 (John) | installed | TS1 | LOC1 |
| Spelling game | 2222 (Alice) | purchased | TS2 | LOC2 |
| Fishing game | 5555 (Joe) | purchased | TS3 | LOC3 |
| Spreadsheet | 3333 (Bob) | purchased | TS4 | LOC4 |
| Spelling game | 1111 (Jill) | purchased | TS5 | LOC5 |

FIG. 11  AD REQUEST LOG

| Ad Request ID | Limited ID cookie |
|---|---|
| 1 | LIC1 (John) |
| 2 | LIC2 (Jill) |
| 3 | LIC3 (Alice) |
| 4 | LIC4 (Bob) |
| 5 | LIC5 (Joe) |

FIG. 12   CONVERSION LOG WITHOUT LIMITED ID COOKIE

| Ad ID | Ad Request ID | Action | Timestamp | Location |
|---|---|---|---|---|
| ad1 | 1 | installed | TS1 | LOC1 |
| ad2 | 3 | purchased | TS2 | LOC2 |
| ad3 | 5 | purchased | TS3 | LOC3 |
| ad5 | 4 | purchased | TS4 | LOC4 |
| ad2 | 2 | purchased | TS5 | LOC5 |

FIG. 13  SOCIAL GRAPH TABLE

| Name | Contact | Contact | Contact | Contact |
|------|---------|---------|---------|---------|
| Bob | Alice | Mark | David | (empty) |
| Nancy | John | David | Oscar | Paul |
| Abe | Cindy | Joe | Bob | Nancy |
| Jill | Jennifer | Mary | (empty) | (empty) |
| Joe | Mindy | Paul | Andrew | Susan |

FIG. 14    ENTITY ID TABLE

| Ad ID | Entity ID |
|-------|-----------|
| ad1 | Virtual Bowling |
| ad2 | Spelling game |
| ad3 | Fishing game |
| ad4 | Spelling game |
| ad5 | Virtual Bowling |

FIG. 15  RECOMMENDATION TABLE

| Ad ID | Who Recommended |
|-------|-----------------|
| ad1   | Joe             |
| ad4   | Alice           |
| ad3   | Bob             |
| ad1   | Bob             |
| ad5   | Paul            |

FIG. 16

CONVERSION LOG WITH LIMITED ID COOKIE

| Ad ID | Limited ID cookie | Action | Timestamp | Location |
|---|---|---|---|---|
| ad1 | LIC1(John) | installed | TS1 | LOC1 |
| ad2 | LIC3(Alice) | purchased | TS2 | LOC2 |
| ad3 | LIC5(Joe) | purchased | TS3 | LOC3 |
| ad5 | LIC4(Bob) | purchased | TS4 | LOC4 |
| ad2 | LIC2(Jill) | purchased | TS5 | LOC5 |

METHOD, APPARATUS, AND COMPUTER-READABLE MEDIUM FOR SERVING DETAILED SOCIAL ANNOTATIONS

This application is a Continuation of application Ser. No. 13/239,081 filed on Sep. 21, 2011 now abandoned, the entire contents of which are hereby incorporated by reference and for which priority is claimed under 35 U.S.C. §120.

FIELD OF ENDEAVOR

Aspects of the present invention relate to methods, apparatuses, and computer-readable media to serve detailed social annotations. Aspects of the invention are useful in a variety of applications, including the providing of useful and relevant ads to users. Specifically, aspects of the present invention relate to storing records of conversions made by a user's contacts and serving details of such conversions to the user.

BACKGROUND

Internet-based advertising has had varying degrees of success. Advertising such as banner ads may be shown to visitors to a webpage. Banner ads, however, are sometimes largely ineffective. Ad viewers may ignore the banner ads because the ads are generically designed for a large audience. Ad viewers may not feel that the ad sends a message that is relevant to them. Because the message of the ad is not considered relevant by ad viewers, the ad suffers from a lower click-through rate. Ad viewers miss an opportunity to obtain a valuable service or product, and the advertiser loses a valuable opportunity to gain a customer.

As recognized by the inventors, increasing the relevance of the message of the ad is desired. In one approach, the content of the webpage that a user is viewing is used to choose an ad for a user. However, the message of the ad is still generically aimed at a large audience. Such an approach only addresses the fleeting interests of the user at the moment that the user is viewing the webpage, and may not appeal strongly to the user. In light of such drawbacks, a better approach to delivering an advertising message that more strongly appeals to the user is desired.

SUMMARY

In one aspect of the invention, the invention may include a method performed by one or more data processing apparatuses, including: receiving data indicating that a first user has converted by performing a conversion action in response to an ad, wherein the ad is associated with an entity ID; receiving an ad request from a client, wherein the client is operated by a second user; in response to receiving the ad request, selecting an ad with an ad ID, sending the ad ID to the client, obtaining an entity ID associated with the ad ID, and retrieving conversion records that match the entity ID from a conversion table, wherein the conversion records each associate the user ID of the user who performed the conversion action and the entity ID of an entity to which the conversion action relates; filtering out conversion records containing user IDs that are not social contacts of the second user; constructing a detailed annotation based on at least one of the filtered conversion records that contains a user ID for the first user, wherein the detailed annotation includes an identifier of the user ID of the first user and indicates the conversion action of the first user; and sending the detailed annotation to the client; wherein the entity ID is associated with multiple ad IDs.

A further aspect of the method of the present invention may include sending the detailed annotation to the client further comprises sending the detailed annotation to an iframe.

In a further aspect of the method of the present invention, the detailed annotation may be constructed based on the conversion record and at least one other conversion record.

A further aspect of the method of the present invention may include selecting at least one of the filtered conversion records for constructing the detailed annotation, wherein the selected filtered conversion record contains the user ID for the first user.

In a further aspect of the method of the present invention, the selecting at least one of the filtered conversion records may be based on an affinity score between the first user and the second user.

A further aspect of the method of the present invention may include boosting an ad score of the ad over another ad that is only associated with a recommendation.

A further aspect of the method of the present invention may include receiving a request for an annotation from the client after sending the ad ID to the client; and sending the detailed annotation to the client after receiving the annotation request.

A further aspect of the method of the present invention may include writing a conversion log entry with a limited ID cookie; wherein the limited ID cookie contains an encrypted user ID for the first user.

A further aspect of the method of the present invention may include reading the log entry; creating a conversion record based on the log entry; and entering the conversion record into a conversion table.

A further aspect of the method of the present invention may include writing a log entry with a limited ID cookie and writing another log entry with a second ad ID and the conversion action; wherein the limited ID cookie contains an encrypted user ID for the first user.

In one aspect of the invention, the invention may include a computer-implemented method that includes receiving data indicating that a first user has converted by performing a conversion action in response to an ad, wherein the ad is associated with an entity ID; receiving an ad request from a client, wherein the client is operated by a second user; in response to receiving the ad request, selecting an ad with an ad ID, sending the ad ID to the client, obtaining an entity ID associated with the ad ID, and retrieving conversion records that match the entity ID from a conversion table, wherein the conversion records each associate the user ID of the user who performed the conversion action and the entity ID of an entity to which the conversion action relates; filtering out conversion records containing user IDs that are not social contacts of the second user; constructing a detailed annotation based on at least one of the filtered conversion records that contains a user ID for the first user, wherein the detailed annotation includes an identifier of the user ID of the first user and indicates the conversion action of the first user; and sending the detailed annotation to the client.

In another aspect of the invention, the invention may include a computer-implemented method that includes receiving data indicating that a first user has converted by performing a conversion action in response to an ad, wherein the ad is associated with an entity ID; writing a log entry with a limited ID cookie and writing another log entry with a first ad ID and the conversion action; wherein the limited ID cookie contains an encrypted user ID for the first user; reading the log entry with the limited ID cookie and reading the another log entry with the entity ID and the conversion action; sending the limited ID cookie to a server; receiving a user ID from the server; creating a conversion record with the user ID; and entering the conversion record into a conversion table; receiving an ad request from a client, wherein the client is operated by a second user; in response to receiving the ad request, selecting an ad with a second ad ID, sending the second ad ID to the client, obtaining an entity ID associated with the second ad ID, and retrieving conversion records that match the entity ID from a conversion table, wherein the conversion records each associate the user ID of the user who performed the conversion action and the entity ID of an entity to which the conversion action relates; filtering out conversion records containing user IDs that are not social contacts of the second user; constructing a detailed annotation based on at least one of the filtered conversion records that contains a user ID for the first user, wherein the detailed annotation includes an identifier of the user ID of the first user and indicates the conversion action of the first user; and sending the detailed annotation to the client.

In another aspect of the invention, the invention may include a system including: one or more computers; a computer-readable medium coupled to the one or more computers having instructions stored thereon which, when executed by the one or more computers, causes the one or more computers to perform operations including: receiving data indicating that a first user has converted by performing a conversion action in response to an ad, wherein the ad is associated with an entity ID; receiving an ad request from a client, wherein the client is operated by a second user; in response to receiving the ad request, selecting an ad with an ad ID, sending the ad ID to the client, obtaining an entity ID associated with the ad ID, and retrieving conversion records that match the entity ID from a conversion table, wherein the conversion records each associate the user ID of the user who performed the conversion action and the entity ID of an entity to which the conversion action relates; filtering out conversion records containing user IDs that are not social contacts of the second user; constructing a detailed annotation based on at least one of the filtered conversion records that contains a user ID for the first user, wherein the detailed annotation includes an identifier of the user ID of the first user and indicates the conversion action of the first user; and sending the detailed annotation to the client.

A further aspect of the system of the present invention may include sending the detailed annotation to the client further comprises sending the detailed annotation to an iframe.

A further aspect of the system of the present invention may include the detailed annotation is constructed based on the conversion record and at least one other conversion record.

A further aspect of the system of the present invention may include the computer-readable medium has further instructions stored thereon which, when executed by the one or more computers, causes the one or more computers to perform further operations comprising: selecting at least one of the filtered conversion records for constructing the detailed annotation, wherein the selected filtered conversion record contains the user ID for the first user.

A further aspect of the system of the present invention may include the selecting at least one of the filtered conversion records is based on an affinity score between the first user and the second user.

A further aspect of the system of the present invention may include the computer-readable medium has further instructions stored thereon which, when executed by the one or more computers, causes the one or more computers to perform further operations comprising: boosting an ad score of the ad over another ad that is only associated with a recommendation.

A further aspect of the system of the present invention may include the computer-readable medium has further instructions stored thereon which, when executed by the one or more computers, causes the one or more computers to perform further operations comprising: receiving a request for an annotation from the client after sending the ad ID to the client; and sending the detailed annotation to the client after receiving the annotation request.

A further aspect of the system of the present invention may include the computer-readable medium has further instructions stored thereon which, when executed by the one or more computers, causes the one or more computers to perform further operations comprising: writing a conversion log entry with a limited ID cookie; wherein the limited ID cookie contains an encrypted user ID for the first user.

A further aspect of the system of the present invention may include the computer-readable medium has further instructions stored thereon which, when executed by the one or more computers, causes the one or more computers to perform further operations comprising: reading the log entry; creating a conversion record based on the log entry; and entering the conversion record into a conversion table.

A further aspect of the system of the present invention may include the computer-readable medium has further instructions stored thereon which, when executed by the one or more computers, causes the one or more computers to perform further operations comprising: writing a log entry with a limited ID cookie and writing another log entry with a second ad ID and the conversion action; wherein the limited ID cookie contains an encrypted user ID for the first user.

In another aspect of the invention, the invention may include a computer-readable medium encoded with a computer program including instructions that, when executed, operate to cause a computer to perform operations including: receiving data indicating that a first user has converted by performing a conversion action in response to an ad, wherein the ad is associated with an entity ID; receiving an ad request from a client, wherein the client is operated by a second user; in response to receiving the ad request, selecting an ad with an ad ID, sending the ad ID to the client, obtaining an entity ID associated with the ad ID, and retrieving conversion records that match the entity ID from a conversion table, wherein the conversion records each associate the user ID of the user who performed the conversion action and the entity ID of an entity to which the conversion action relates; filtering out conversion records containing user IDs that are not social contacts of the second user; constructing a detailed annotation based on at least one of the filtered conversion records that contains a user ID for the first user, wherein the detailed annotation includes an identifier of the user ID of the first user and indicates the conversion action of the first user; and sending the detailed annotation to the client.

A further aspect of the computer-readable medium of the present invention may include sending the detailed annotation to the client further comprises sending the detailed annotation to an iframe.

A further aspect of the computer-readable medium of the present invention may include the detailed annotation is constructed based on the conversion record and at least one other conversion record.

A further aspect of the computer-readable medium of the present invention may include instructions that, when executed, operate to cause the computer to perform further operations comprising: selecting at least one of the filtered conversion records for constructing the detailed annotation, wherein the selected filtered conversion record contains the user ID for the first user.

A further aspect of the computer-readable medium of the present invention may include instructions that, when executed, operate to cause the computer to perform further operations comprising: selecting at least one of the filtered conversion records is based on an affinity score between the first user and the second user.

A further aspect of the computer-readable medium of the present invention includes the instructions that, when executed, operate to cause the computer to perform further operations comprising: boosting an ad score of the ad over another ad that is only associated with a recommendation.

A further aspect of the computer-readable medium of the present invention includes instructions that, when executed, operate to cause the computer to perform further operations comprising: receiving a request for an annotation from the client after sending the ad ID to the client; and sending the detailed annotation to the client after receiving the annotation request.

A further aspect of the computer-readable medium of the present invention includes instructions that, when executed, operate to cause the computer to perform further operations comprising: further comprising writing a conversion log entry with a limited ID cookie; wherein the limited ID cookie contains an encrypted user ID for the first user.

A further aspect of the computer-readable medium of the present invention includes instructions that, when executed, operate to cause the computer to perform further operations comprising: reading the log entry; creating a conversion record based on the log entry; and entering the conversion record into a conversion table.

A further aspect of the computer-readable medium of the present invention includes instructions that, when executed, operate to cause the computer to perform further operations comprising: writing a log entry with a limited ID cookie and writing another log entry with a second ad ID and the conversion action; wherein the limited ID cookie contains an encrypted user ID for the first user.

Further scope of applicability of the methods, apparatuses, and computer-readable storage mediums discussed will become apparent from the detailed description given hereinafter. However, it should be understood that the detailed description and specific examples, while indicating embodiments, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein:

FIG. 7 illustrates steps taken by an ads scorer to construct a detailed annotation, according to an embodiment.

FIG. 10 illustrates a conversion table, according to an embodiment.

FIG. 11 illustrates an ad request log, according to an embodiment.

FIG. 12 illustrates a conversion log with no limited ID cookie, according to an embodiment.

FIG. 13 illustrates a social graph table, according to an embodiment.

FIG. 14 illustrates an entity ID table, according to an embodiment.

FIG. 15 illustrates a recommendation table, according to an embodiment.

FIG. 16 illustrates a conversion log with limited ID cookie, according to an embodiment.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

INTRODUCTION

Figure 18:
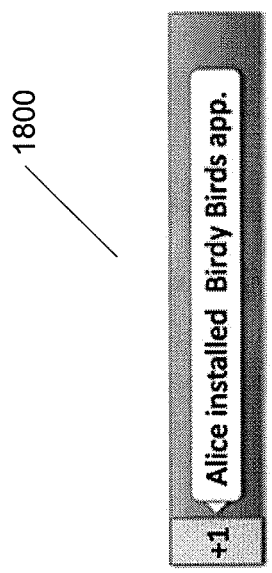
FIG. 18 illustrates an example detailed annotation, according to an embodiment.

In one embodiment, an ad displayed to a user on a device is annotated with detailed annotations. A detailed annotation is an annotation of conversion activity by a social contact in a user's social graph. The detailed annotations may be written over or included within the ad. The detailed annotations are of the form social contact(s)+conversion action+ entity. The annotation indicates the conversion action of the social contact(s). For example, a detailed annotation may be "Alice installed Application #1", where "Alice" is the name of a social contact of the person viewing the ad (hereafter "user"), "installed" is the conversion action, and "Application #1" is a reference to the entity. An example detailed annotation graphic 1800 is shown in FIG. 18, in which the detailed annotation "Alice installed Birdy Birds App" is displayed to the user. In the example of FIG. 18, "Alice" is the user, "installed" is the conversion action, and Birdy Birds app is the application that Alice installed.

A social contact is an acquaintance of the user, and the user's social contacts are recorded in a table in a storage. More than one social contact may be shown in the detailed annotation. For example, the detailed annotation may display as "Alice, Jill, and Bob installed this application". In some embodiments, an image that is a photo or avatar of the social contact may be displayed with the annotation. In some embodiments, photos or avatars may be displayed in place of the names.

An entity is a subject of an ad. An entity may be associated with one or more ads. For example, a game application such as "Spelling game" may be an entity with one or more ads placed by an advertiser. An advertiser may be associated with one or more entities. In the example above, the conversion action of "installed" is referred to as a "conversion". Here, Alice "converts" by installing the application. A conversion is an activity that the advertiser wants the user to perform. Other examples of conversions are the purchase of the application, the rental of a movie, the leasing of an application, a trial installation, or the purchase of shampoo.

Because the ad is annotated using the names of one or more social contacts of the user, the message of the ad with the detailed annotations, as a whole, more strongly appeals to the user. Even though the ad may be generically designed for a larger audience, the annotation with the name of the social contact of the user increases the relevance to a user. The detailed annotations are constructed and served to applications and web browsers by a social annotation system such as the social annotation system described with respect in FIG. 1*a* and FIG. 1*b* below.

Structural Overview

Figure 1A:
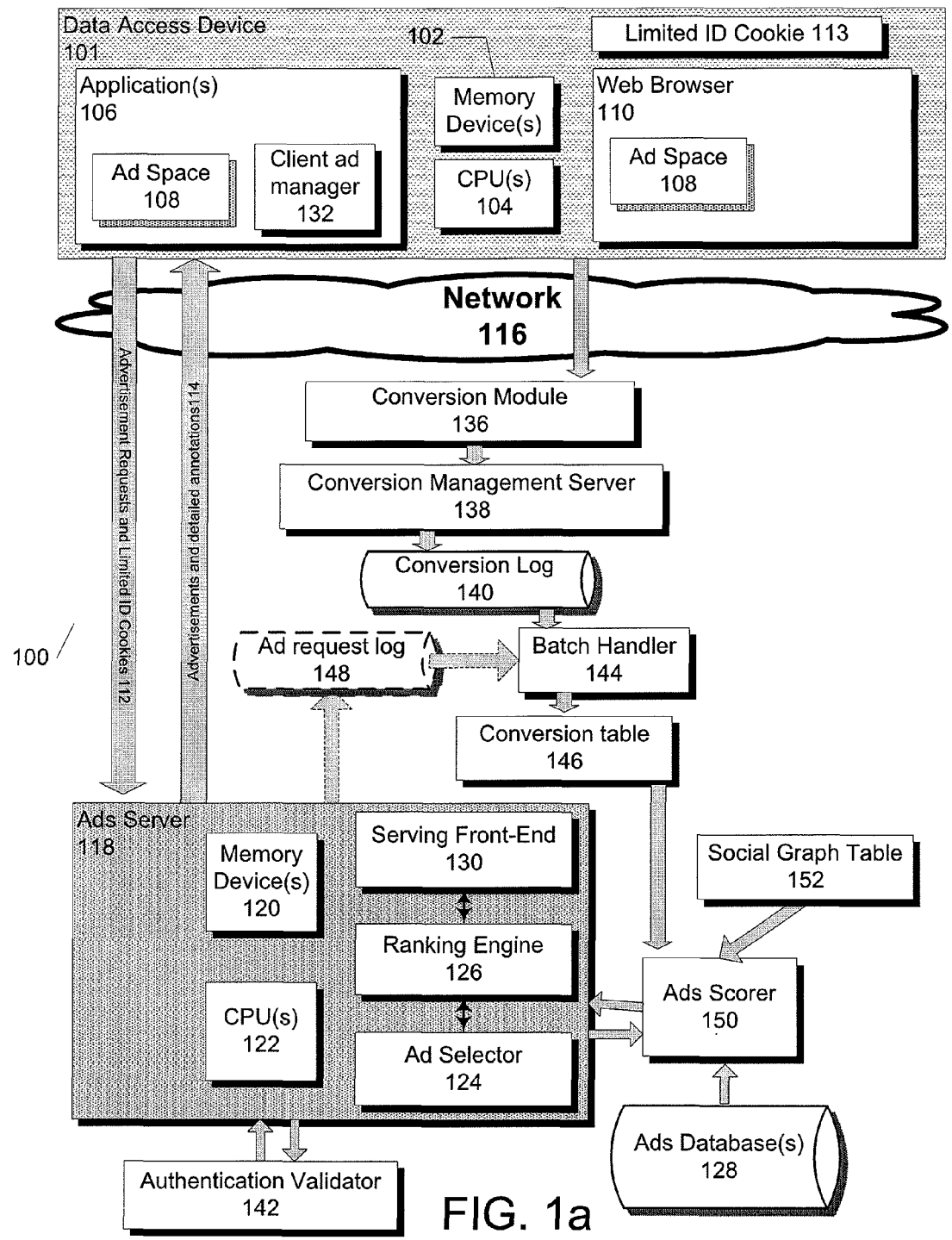
FIG. 1a is a block diagram illustrating a social annotation system where detailed annotations regarding conversions made by a user's contacts are served by an ad scorer, for display to the user, according to an embodiment.
Figure 1B:
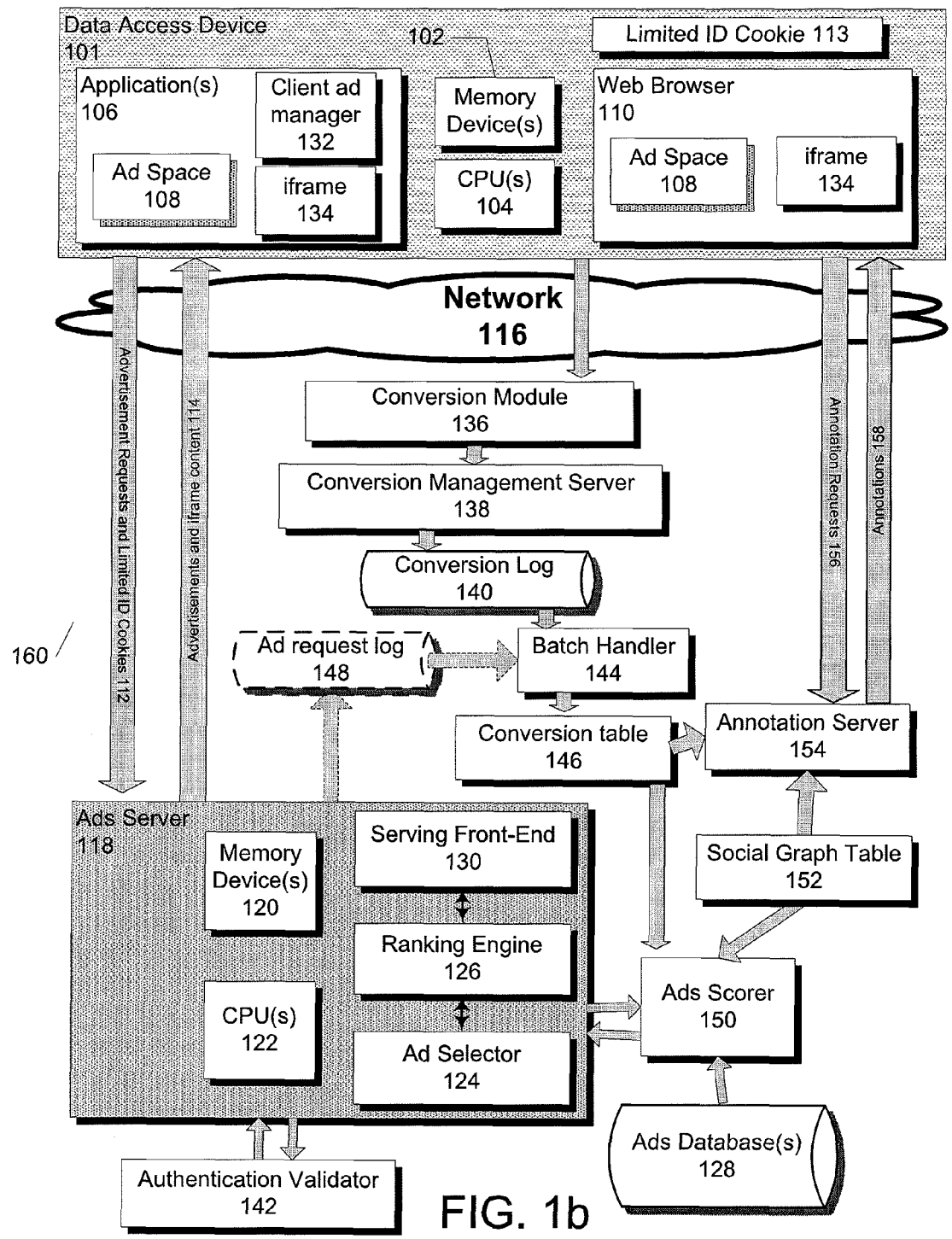
FIG. 1b is a block diagram illustrating a social annotation system where detailed annotations regarding conversions made by a user's contacts are served by an annotation server, for display to the user, according to another embodiment.

FIG. 1*a* is a block diagram illustrating a social annotation system 100 where detailed annotations regarding conversions made by a user's contacts are served by an ads scorer, for display to the user, according to an embodiment. FIG. 1*b* is a block diagram illustrating a social annotation system 160 where detailed annotations regarding conversions made by a user's contacts are served by an annotation server, for display to the user, according to an embodiment. The detailed annotations may be served to an application or a web browser, in response to a request for an ad from the application or the web browser. FIG. 1*a* and FIG. 1*b* illustrates modules of social annotation system 100 and some of the communications sent between the modules when an ad request is received from an application or from a web browser. FIG. 1*b* depicts modules and communications that are not depicted in FIG. 1*a*. For example, FIG. 1*b* includes an iframe 134, an annotation server 154, annotation requests 156, and annotations 158. The following description refers to FIG. 1*a* and/or FIG. 1*b*.

An embodiment of a mobile data access device 101 which is operated by the user may include a mobile telephone, a mobile handheld device, a media tablet device, netbook, notebook computer, GPS device, media player device, or some combination thereof or variation thereof. Mobile data access device 101 is hereafter referred to as "client" 101.

The client 101 may include one or more memory devices 102 for storing applications, application data, webpages, images, audio and/or video, device settings and/or preferences, and other information relevant to the operation, use, and potential user(s) of the device. A client 101 may also include one or more processors 104 to process the information and execute the applications stored in the memory device(s) 102. Variations of memory 102 and processor 104 devices may include magnetic, electronic, and/or optical devices and/or combinations thereof.

Some variations of a client 101 may include a display screen (not shown) and/or a speaker (not shown). Other variations of a client may include signal output paths such as wired or wireless connections to external audio and/or video devices such as docking stations, earphones, near field communication devices, external displays, and other similar information presentation devices.

A client 101 may include one or more applications 106. Some variations of applications 106 may include designated ad space 108 for the display of advertisements related to an application or the content/information presented or processed therein. A client 101 may also include one or more web browser tools 110 for viewing and interacting with webpages via a wired or wireless internet connection and/or via a mobile data exchange connection such as cellular, optical, near field communication, or some combination thereof. Some variations of a web browser 110 may also include a designated ad space 108 for the display of advertisements related to webpage content, search results, web-based email, map information, and/or geo-temporal factors.

The client 101 may submit advertisement requests 112 and receive served advertisements 114 via a communication network 116 such as the internet, a public, private, wired, and/or wireless local area network (LAN) or wide area network (WAN), a cellular communication network, telephone lines, radio-frequency networks, hard-wired connections, and/or combinations thereof. The ad requests 112 and served advertisements 114 may go to and from an ads server 118. In some embodiments, the ad request 112 may include a limited ID cookie 113, which is a cookie containing an encrypted unique identifier for the user. In some embodiments, the ad request may also include information about an ad ID and a unique user ID. The unique user ID may be a hash of a client device ID. In some embodiments, the advertisements 114 may include detailed annotations which are sent to client 101 for display. In some embodiments, the served ads 114 are sent over HTTP and the detailed annotations are served over a secure HTTP connection (HTTPS).

An embodiment of an ads server 118 may be equipped with one or more memory devices 120 for storing information and one or more processors 122 for performing data processing operations. The embodiment shown is also equipped with an ad selector 124 and an optional ranking engine 126 that selects and optionally ranks ads from an ads database 128, and a serving frontend 130 that delivers the advertisement via network 116 to client 101.

In some embodiments, a client ad manager 132 may be compiled with the application 106 and become embedded within application 106. Client ad manager 132 thus may form an integral part of application 106. The client ad manager 132 manages advertising for application(s) 106, including sending requests for advertisements to ads server 118 and receiving ads from ads server 118.

In some embodiments, application(s) and/or web browser 110 includes an iframe 134 with iframe content sent from ads server 118. The iframes depicted in FIG. 1*b* form part of an embodiment in which ads server sends iframe content to client in response to an ad request. The iframe 134 requests detailed annotations and receives detailed annotations for display to the user.

The embodiment may also include a conversion module 136. Conversion module 136 allows the user to perform conversions. Conversion module 136 is, for example, an application that allows the user to purchase and install applications. Another example of a conversion module 136 is an application that allows a user to order products. When a user performs a conversion, data regarding the conversion is sent from the conversion module 136 to a conversion management server 138.

Conversion management server 138 manages the entry of data into a conversion log 140. Conversion log 140 may be multiple logs storing conversion data. Conversion management server 138 may send limited ID cookies to an authentication validator 142 to obtain user IDs. Each limited ID cookie is an encrypted cookie containing user ID data. Client 101 may store a copy of limited ID cookie received from the limited ID cookie generator server (not depicted in FIG. 1*a* or FIG. 1*b*).

The limited ID cookie is a cookie, created by a limited ID cookie generator server, that contains an encrypted social networking ID from the user's social networking account. The limited ID cookie is considered "weak" because the limited ID cookie cannot be decrypted by other third party services or applications and can be used only for social ad targeting. In some embodiments, the limited ID cookie may also be used to keep track of user presence in social networks. The limited ID cookie may include a timestamp and have a limited lifetime.

As a security measure, only a specially designated server, authentication validator 142, may decrypt the limited ID cookie and retrieve the user ID that is stored inside the limited ID cookie. If an unauthorized party gains access to the limited ID cookie, the potential harm to the user is limited to social ad targeting using the social networking ID. Through the use of the limited ID cookies, the use of a more generalized, permanent identification cookie that may allow for all types of access and transactions for the user is unnecessary for serving detailed annotations. Thus, the user need not expose other more powerful social networking identification cookies, and because the limited ID cookie is only useful for social ad targeting and may expire, the damage that may occur due to unauthorized access of the limited ID cookie is limited.

In an embodiment, a user ID is a unique value that identifies a user or a social contact in a social network. For example, the user ID may be a long integer. The user ID may be the social networking ID of the user or social contact. No two users or social contacts may have the same user ID. In some embodiments, conversion management server 138 writes the conversions into a conversion log 140. The data that is written may include an ad ID, a limited ID cookie, and a conversion action. For example, conversion log 140 may be a file or a database. In some embodiments, conversion log 140 includes a column for ad request ID. In some embodiments, conversion log 140 includes a column for limited ID cookie.

In an embodiment, a batch handler 144 reads conversion log entries from the conversion log 140. The batch handler 144 may read from conversion log 140 and enter records into a conversion table 146 asynchronously. That is, the batch handler 144 may read the conversion log entries between time intervals, and process a batch of conversion log entries at a time.

The batch handler 144 processes the log entries that are read to create conversion records, and enters the conversion records into conversion table 146. In some embodiments, the batch handler 144 may optionally utilize entries from an ad request log 148 in order to create the conversion records for writing into conversion table 146. Ad request log 148 may be multiple logs storing ad requests.

The embodiment may include an ads scorer 150 that selects an ad to send to ads server 118. In some embodiments, ads scorer 150 may be part of ads server 118. In some embodiments, the functions of ads scorer 150 may be implemented within ranking engine 126 and/or ad selector 124. In some embodiments, ads scorer 150 retrieves records from conversion table 146 and retrieves records from a social graph table 152 to construct a detailed annotation for sending to ads server 118. In some embodiments, the ad that ads scorer 150 selects for sending to ads server 118 may be affected by information retrieved from conversion table 146 and social graph.

The embodiment may also include authentication validator 142. In some embodiments, ad server 119 may send a limited ID cookie to authentication validator 142, and receive a user ID from authentication validator 142. Authentication validator 142 decrypts the limited ID cookie and provides the user ID that is stored in the limited ID cookie to ads server 118. In some embodiments, annotation server 142 decrypts the limited ID cookie and provides the user ID that is stored in the limited ID cookie to any module or other requester that requests the user ID.

The embodiment may also include an annotation server 154. Annotation server 154 constructs and serves detailed annotations to the client 101*s* that submit ad requests. When ads server 118 receives a request from the client 101, in an embodiment, ads server 118 sends an ad and iframe content to client 101. The iframe content is installed on client 101, on the application or web browser that requested the ad. Iframe 134 sends annotation requests 156 to annotation server 154. Annotation server 154 retrieves records from conversion table 146 and retrieves records from social graph table 152 to construct detailed annotations 158. The detailed annotations may be sent back to client 101 with advertisements 114. The arrows connected to annotation server 154 represent communications that form part of an embodiment illustrated by FIG. 1*b* in which ads server 118 sends iframe content to client 101 in response to an ad request, and the iframe sends an annotation request to annotation server 154.

In an embodiment, as illustrated in FIG. 1*b*, in response to an advertisement request 112, ads server 118 returns an advertisement with an ad id and iframe content. The iframe 134, with executing iframe content, sends the annotation requests 156 to annotation server 154. Annotation server 154 retrieves records from conversion table 146 and social contact information from social graph table 152 in order to construct detailed annotations, which are sent to iframe 134. In such an embodiment, ads scorer 150 does not construct detailed annotations because the construction of detailed annotations is performed by annotation server 154. Thus, in such an embodiment, ads scorer 150 sends the ad ID of the advertisement to ads server 118 without a detailed annotation.

Ads server may receive requests for ads from an application or from web browser 110. In an embodiment, as illustrated in FIG. 1a, in response to the request from the client, ads server 118 may return an ad and detailed annotation to the client. In an embodiment, as illustrated in FIG. 1b, in response to the request from the client, ads server 118 may return an ad and iframe content.

Some modules, tables, logs, and communications that may be present in the embodiment of FIG. 1a and/or FIG. 1b are not depicted in FIG. 1a and/or FIG. 1b for simplicity of illustration. For example, an entity ID table 1400 of FIG. 14 and a recommendation table 1500 of FIG. 15 are not depicted in the embodiment of FIG. 1a and/or FIG. 1b, although such tables are present in the embodiment and utilized by some of the modules of FIG. 1a and/or FIG. 1b.

Functional Overview

Embodiments for Creating and Storing Conversion Records

In an embodiment, in social annotation system 100, conversion records are created and stored when social contacts of the user converts, and the conversion records are used to construct detailed annotations.

In an embodiment, user IDs and limited ID cookies are not available at conversion. In such an embodiment, social annotation system 100 uses two logs to store log entries regarding conversions. Ads server 118 writes ad request entries with limited ID cookie into a first log, which is ad request log 148. Conversion management server 138 writes conversion entries without limited ID cookies into a second log, conversion log 140. In an embodiment, batch handler 144 matches up limited ID cookies from the ad request log 148 with conversion entries from the conversion log 140 to create conversion records with user IDs, for entry into conversion table 146.

In an embodiment, user IDs and limited ID cookies are available at conversion. In such an embodiment, social annotation system 100 uses a single log to store log entries regarding conversions. Conversion management server 138 writes log entries with limited ID cookies into conversion log 140. Batch handler 144 reads from the conversion log 140. Batch handler 144 sends the limited ID cookies to authentication validator 142 and receives user IDs from the authentication validator 142. Batch handler 144 uses the user IDs to create conversion records with user IDs for entry into conversion table 146.

The terms "advertisement" and "ad" are interchangeable as used in the present patent specification. The terms "identification" and "ID" are interchangeable as used in the present patent specification.

User ID Available at Conversion

Figure 2:
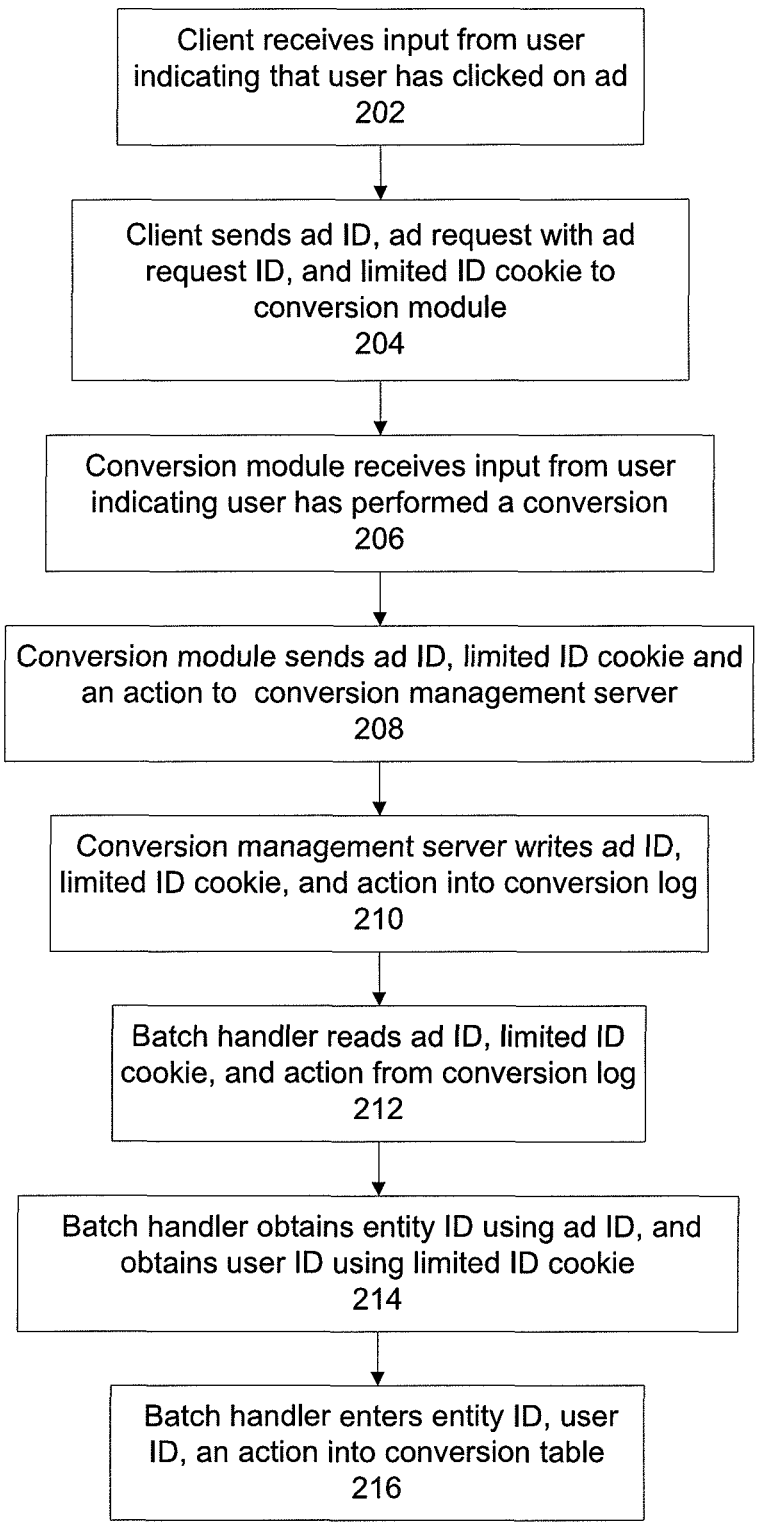
FIG. 2 is a flow diagram illustrating entering a record in a conversion table with user ID, according to an embodiment.

FIG. 2 is a flow diagram illustrating entering a record in a conversion table with user ID, according to an embodiment. In the embodiment depicted in FIG. 2, either limited identification cookies do not expire or renewal of limited identification cookies is possible. Limited ID cookie contains an encrypted user ID that identifies a user. The encrypted limited ID cookie is issued by a server that provides such cookies. In an embodiment, a limited ID cookie expires after a period of time, and may be renewed by an application with permission to renew limited ID cookies. In some embodiments, limited ID cookies do not expire. For both embodiments, batch handler 144 performs the steps depicted in FIG. 2 to populate conversion table 146 with records that include a user ID.

As illustrated in FIG. 2, the client receives input from the user indicating that the user has clicked on an ad, in step 202. In step 204, the client sends ad ID, an ad request with an ad request ID, and a limited ID cookie to the conversion module 136. Every ad that is displayed to the user is associated with a unique ad ID number. Ad request ID is an identifier generated by ads server 118 at a earlier point in time, when ads server 118 received an ad request from the client at that earlier point in time. In some embodiments, the ad request ID is a wrapper that contains the ad ID.

In step 206, conversion module 136 receives input from the user indicating that the user has performed a conversion. In some embodiments, the conversion module 136 may be utilized by the user to perform a conversion event. For example, the conversion module 136 may allow users to purchase and install applications, and the user may purchase an application via an interface of the conversion module 136. The purchase of the application is a conversion. In step 208, the conversion module 136 sends the ad ID, the limited ID cookie, and a conversion action to conversion management server 138. A conversion action represents the actual conversion act performed by the user. For example, the conversion action may be "purchased this application" or "installed this application". An ad ID is a unique identification for an advertisement.

In step 210, conversion management server writes the ad ID, the limited ID cookie, and the conversion action into conversion log 140. An example of conversion log 140 with limited ID cookie is illustrated in FIG. 16. In some embodiments, conversion log 140 has a column for limited ID cookies. In some embodiments, the ad request ID column is optionally present in the conversion log. In some embodiments, conversion management server may also write timestamp and location data into conversion log 140.

In step 212, batch handler 144 reads the ad ID. The limited ID cookie, and the conversion action from conversion log 140. Batch handler 144 may read from conversion log 140 periodically. For example, batch handler 144 may read from conversion log 140 once every hour.

In step 214, batch handler 144 obtains an entity ID using the ad ID, and obtains a user ID using the limited ID cookie. Batch handler 144 searches for the ad ID in the entity ID table to find a matching entity ID. Batch handler 144 sends the limited ID cookie to authentication validator 142, and receives a user ID from authentication validator 142. A unique entity ID is associated with each entity. For example, a game application may have an entity ID. In some embodiments, an entity ID may be a long integer value.

The records of the entity ID table may be populated using one of two possible methods or a mix of the two methods. According to one method, conversion management server 138 may enter the ad ID and entity ID values into the entity ID table. According to another method, an advertiser may submit the ad ID and entity ID values to batch handler 144 for entry into the entity ID table. Although two methods of populating entity ID table are discussed, other methods may also be possible. Each entity ID may be associated with multiple ad IDs. Batch handler 144 also uses the limited ID cookie to obtain the user ID. Batch handler 144 sends the limited ID cookie to authentication validator 142, which decrypts the limited ID cookie and returns a user ID. The user ID is used for identification in social networking and no two users have the same user ID.

In step 216, batch handler 144 enters the entity ID, the user ID, and the conversion action into conversion table 146. As part of each record entered into the conversion table 146, batch handler 144 may also enter a timestamp and location ID. Batch handler 144 may extract the timestamp and location from the conversion log 140. For example, the conversion record that is entered into conversion table 146 may indicate that Alice has purchased the application in response to an advertisement for the application. The data that is entered into the conversion table 146 may be used to construct detailed annotations.

User ID Unavailable at Conversion

Figure 3:
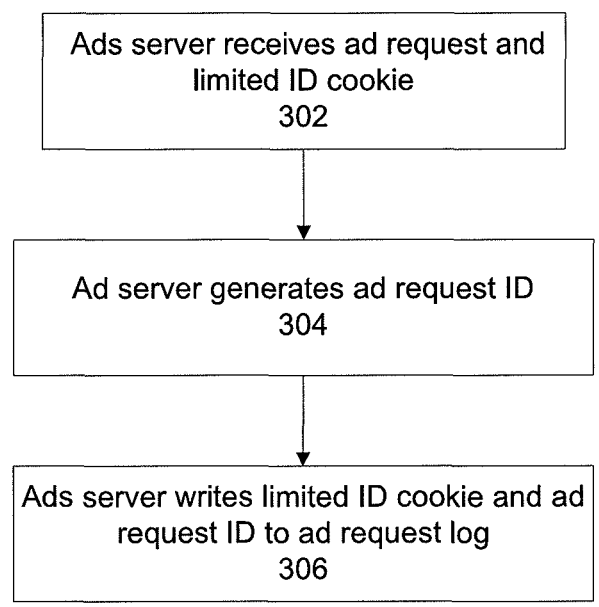
FIG. 3 is a flow diagram illustrating writing a limited ID cookie and an ad request ID into an ad request log, according to an embodiment.
Figure 4:
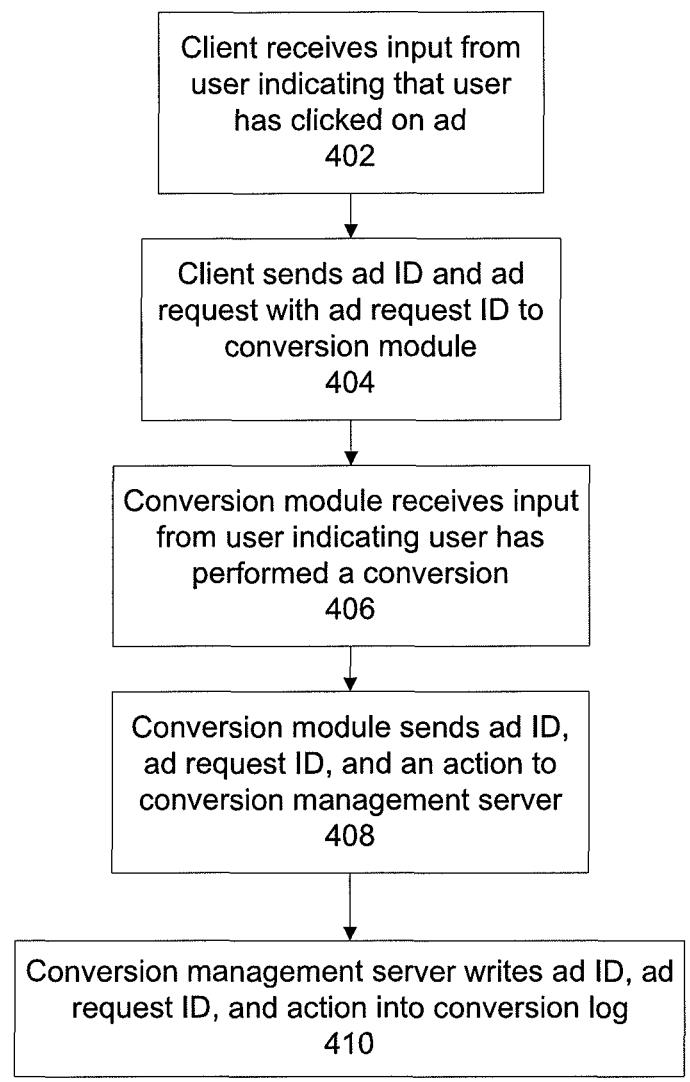
FIG. 4 is a flow diagram illustrating writing a log entry of a conversion into a conversion log without a limited ID cookie, according to an embodiment.
Figure 5:
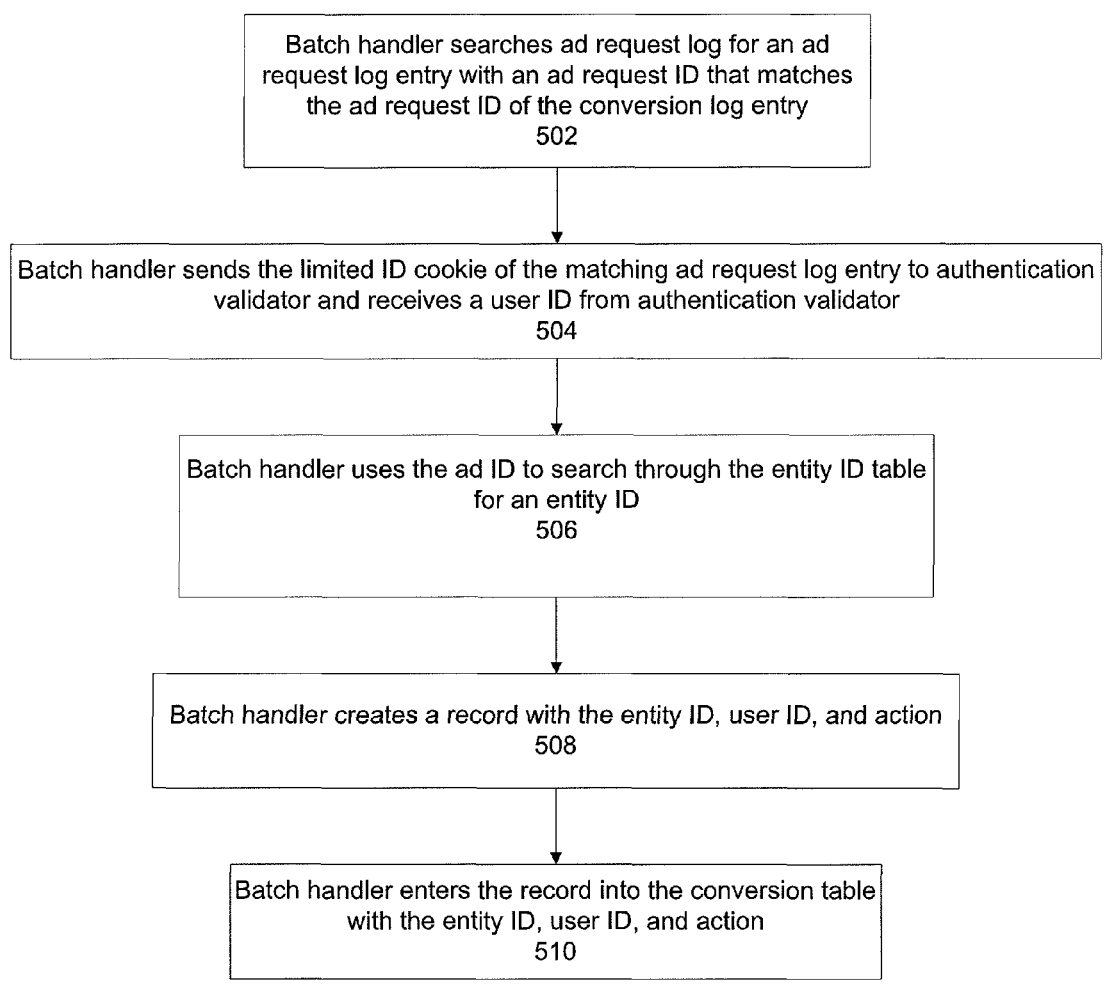
FIG. 5 is a flow diagram illustrating matching a conversion log entry with an ad request log entry in order to create a conversion record, according to an embodiment.

In an embodiment, the techniques illustrated in FIG. 3, FIG. 4, and FIG. 5 in combination allows for writing conversion records with user IDs into a conversion table. Ads server performs the steps of FIG. 3 prior to conversion management server 138 performing the steps of FIG. 4. Ads server performs the steps of FIG. 3 when ads server 118 receives a request for an ad. Conversion management server 138 performs the steps of FIG. 4 after the user has viewed the ad, and conversion management server 138 performs the steps of FIG. 4 at approximately the time that the user converts by purchasing or installing an application. Batch handler 144 performs the steps of FIG. 5 periodically, and reads the log entries that are written according to the steps of FIG. 3 and the log entries that are written according to the steps of FIG. 4, and creates conversion records that are entered into conversion table 146.

In an embodiment, the steps illustrated in FIG. 3 allow ads server 118 to store limited ID cookies in the ad request log 148. Ad server receives an ad request with a limited ID cookie, generates an ad request ID, and writes the limited ID cookie and the ad request ID to the ad request log 148.

In an embodiment, the steps illustrated in FIG. 4 allow for conversion management server 138 to store conversion data without limited ID cookies in conversion log 140. In response to a user performing a conversion, conversion module 136 sends an ad ID, the ad request ID, and a conversion action to conversion management server 138. Conversion management server 138 writes the ad ID, the ad request ID, and conversion action into the conversion log 140.

In an embodiment, the steps illustrated in FIG. 5 allow for batch handler 144 to use the limited ID cookies stored according to the steps of FIG. 4 with the conversion data stored according to the steps of FIG. 5 to create conversion records that have user IDs. Batch handler 144 enters the created conversion records into conversion table 146. The conversion records are subsequently read from the conversion table 146, and used with social contact data from the social contact table to construct detailed annotations.

Storing Ad Request Log Entry with Limited ID Cookie

FIG. 3 is a flow diagram illustrating writing a limited ID cookie and an ad request ID into the ad request log, according to an embodiment. The steps of FIG. 3 may be performed by ads server 118. As illustrated in FIG. 3, ads server 118 receives an ad request and a limited ID cookie in step 302. The ad request and limited ID cookie are received from the client. The ad request and the limited ID cookie may be received from an application or a web browser executing on the client. The client ad manager 132 that is integrated into the application sends the ad request to the ads server 118 from the application. The web browser includes code execution modules (not depicted in FIG. 1) that executes code to send ad requests to ads server 118.

In step 304, ads server 118 generates ad request ID. The ads server 118 generates the ad request ID and assigns the ad request ID to the ad. In some embodiments, the ad request ID is a long integer. In some embodiments, the ad request ID is a wrapper that contains the ad ID.

In step 306, ads server 118 writes a record containing limited ID cookie and the generated ad request ID to ad request log 148. An example of ad request log 148 is illustrated in FIG. 11. The ad request ID will be used to match up ad request log entries to conversion log entries in order to create conversion records for entering into conversion table 146. The conversion records will be used with records from social graph table 152 to construct detailed annotations.

Storing Conversion Log Entry

FIG. 4 is a flow diagram illustrating writing a log entry of a conversion into the conversion log without a limited ID cookie, according to an embodiment. In some circumstances, a user may view an ad but does not click on the ad until after the limited ID cookie has expired. Some applications may not be allowed to renew expired limited ID cookies because of security reasons. In such circumstances, client cannot send a valid limited ID cookie to conversion management server.

As illustrated in FIG. 4, the client receives input from the user indicating that the user has clicked on an ad, in step 402. In step 404, the client sends ad ID and ad request with an ad request ID to the conversion module 136. Every ad that is displayed to the user is associated with a unique ad ID reference, which made be a numeric value. Every ad request that client sends to conversion module 136 is associated with a unique ad request ID, which made be a long integer. The ad request ID is generated by the ads server 118 when the ad request is first received by the ad server, and returned with the ad to the client. In some embodiments, the ad request ID is a wrapper that contains the ad ID.

In step 406, conversion module 136 receives input from the user indicating that the user has performed a conversion. In some embodiments, the conversion module 136 may be utilized by the user to perform a conversion event. For example, the conversion module 136 may allow users to purchase and install applications, and the user may purchase an application via an interface of the conversion module 136.

In step 408, the conversion module 136 sends ad ID, ad request ID, and a conversion action to conversion management server 138. A conversion action represents the actual conversion act performed by the user. For example, conversion action may be "purchased this application" or "installed this application".

In step 410, conversion management server 138 writes ad ID, ad request ID, and conversion action into conversion log 140. An example of conversion log 140 is illustrated in FIG. 12. As part of each entry written into the conversion log 140, conversion management server 138 may also write a timestamp and location ID. The timestamp and location ID may be received from the client. For example, the conversion entry that is written into conversion log 140 may indicate that Alice has purchased an application in response to an advertisement for the application. The data that is written into the conversion log 140 may be used to create conversion records for entry into the conversion table 146, and the conversion table 146 is used with the social graph table 152 to construct detailed annotations.

Creating Conversion Records from Ad Request Log and Conversion Log

FIG. 5 is a flow diagram illustrating matching a conversion log entry with an ad request log entry in order to create a conversion record, according to an embodiment. In the embodiment depicted in FIG. 5, a technique is described for matching a conversion log entry in conversion log 140 to an ad request log entry in ad request log 148.

The steps illustrated in FIG. 5 may be performed by the batch handler 144. In some embodiments, batch handler 144 off-line (i.e. asynchronously) matches the ad request log 148 and the conversion log 140. In other embodiments, the steps in FIG. 5 may be performed by other servers or modules, such as ads server 118 or the annotation server 154. Batch handler 144 performs the steps of FIG. 5 for each conversion log entry.

In step 502, batch handler 144 searches ad request log 148 for an ad request log entry with an ad request ID that matches the ad request ID of the conversion log entry. For example, the conversion log 1200 illustrated in FIG. 12 has a log entry 1204 with ad request ID value of "3". Batch handler 144 searches for an ad request log entry with the same ad request ID value of "3". In FIG. 11, the ad request log 1100 has a log entry 1106 with an ad request ID value of "3". Thus, batch handler 144 searches and finds ad request log entry 1106, which matches conversion log entry 1204. At this stage, batch handler 144 has a partially completed conversion record. Batch handler 134 has the limited ID cookie for Alice from the ad request log entry 1106, the ad ID value of "ad2", the conversion action of "purchased", and, in some embodiments, the timestamp of "TS2" and location "LOC2".

In step 504, batch handler 144 sends the limited ID cookie of the matching ad request log entry to authentication validator 142 and receives a user ID from authentication validator 142.

In step 506, batch handler 144 uses the ad ID to search through the entity ID table for an entity ID. For example, batch handler may search through entity ID table 1400 of FIG. 14. For ad ID of "ad2", batch handler 144 finds "ad2" is associated with an entity ID for "Spelling game". That is, the advertisement with the ad ID of "ad2" is one of the advertisements associated with the game entity "Spelling game".

In step 508, batch handler 144 creates a record with the entity ID, user ID, and conversion action. In step 510, batch handler 144 enters the record into the conversion table 146 with the entity ID, user ID, and conversion action. In some embodiments, batch handler 144 may also include a timestamp and location with the record that is created and entered into conversion table 146. The conversion records that are created are used with social graph table 152 to create detailed annotations.

In some embodiments, a separate module or batch handler 144 may also create a join table, where the join table stores the result of a join between the ad request log 148 and the conversion log 140, based on the ad request ID key. The result of the join is the join table that may be periodically updated by the separate module running as a separate process. In an embodiment, the separate module may update the join table off-line by periodically searching for updates in the social graph table 152 and the conversion log 140. The separate module may also update the join table based on changes in the logs that trigger updates.

By using the techniques of the disclosed embodiments, the batch handler 144 is able to match ad request log entries and the conversion log entries off-line to create conversions, resulting in increased efficiencies.

Functional Overview

Embodiments for Constructing and Providing a Detailed Annotation

In an embodiment, when ads server 118 receives an ad request from the client, ads scorer 150 selects an ad and constructs a detailed annotation using the conversion records in the conversion table 146 and the social contact records in the social graph table 152. Ads server sends the ad and detailed annotation to the client.

In an embodiment, when ads server 118 receives an ad request from the client, ads server 118 selects an ad and ads server 118 prepares iframe content. The iframe content is displayed on the client as a document within an inline frame and code within the iframe may execute independently and in parallel with the rest of the web page or application displayed on the client. Ads server sends the ad and the iframe to the client in response to the ad request. At the client, the iframe sends an annotation request to annotation server 154, and annotation server 154 constructs a detailed annotation using the records of the conversion table 146 and the social contact records in the social graph table 152. Annotation server 154 sends the detailed annotation in response to the annotation request 156.

Ads Scorer Providing a Detailed Annotation in Response to an Ad Request

Figure 6:
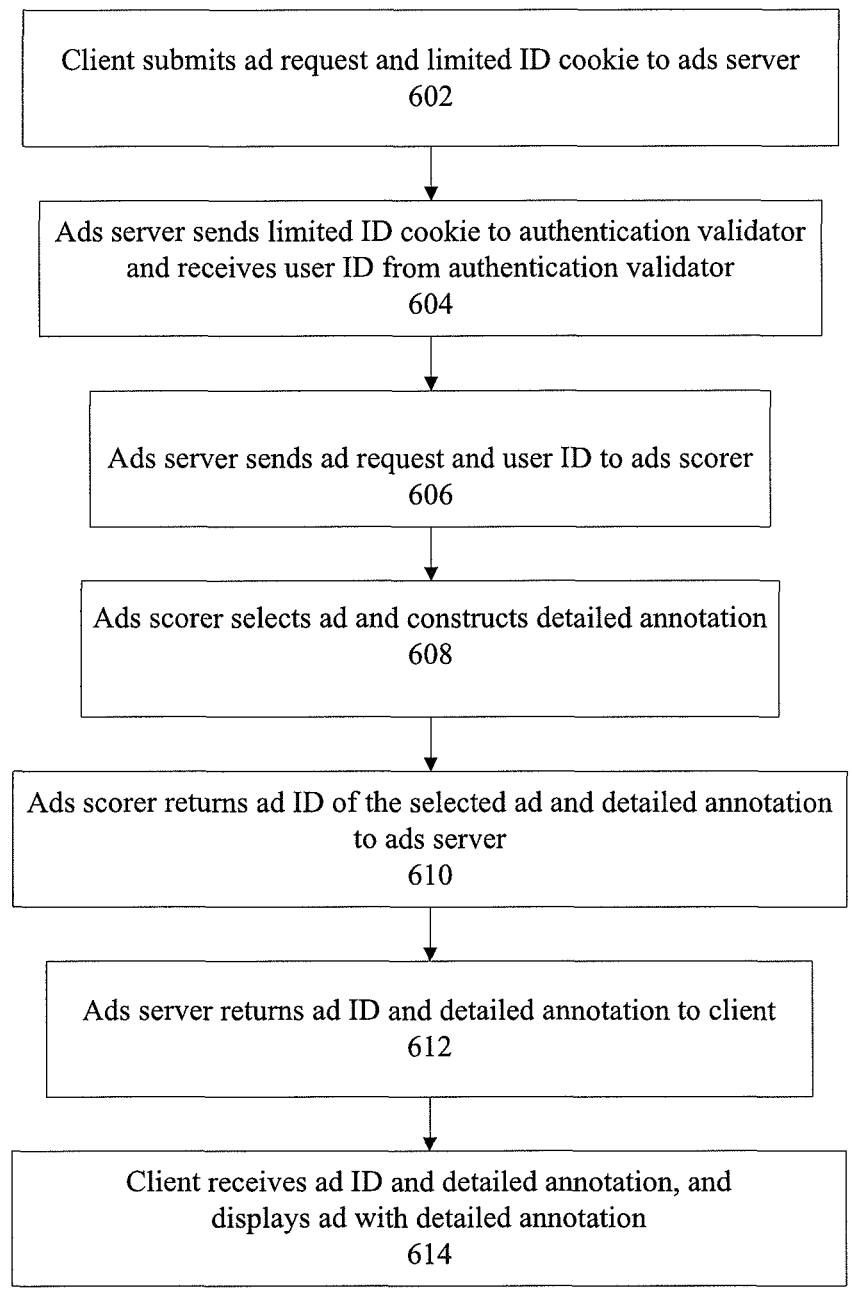
FIG. 6 is a flow diagram illustrating steps that occur in the social annotation system when an ads scorer provides a detailed annotation in response to an ad request, according to an embodiment.

FIG. 6 is a flow diagram illustrating steps that occur in the social annotation system when an ads scorer provides a detailed annotation in response to an ad request, according to an embodiment. As illustrated in FIG. 6, client submits ad request and limited ID cookie to ads server 118 in step 602. This ad request is depicted as advertisement requests and limited ID cookies 112 in FIG. 1. For example, client may send the ad request when the web browser 110 displays a new webpage in response to user input. Client may also send the ad request when client ad manager 132 changes the ad that is displayed in the application 106. The limited ID cookie contains the encrypted user ID that identifies the user.

In step 604, ads server 118 sends limited ID cookie to authentication validator 142 and receives user ID from authentication validator 142. Authentication validator 142 decrypts the limited ID cookie to obtain the user ID. Authentication validator 142 then verifies that the user ID is a valid user ID. Upon successful verification, authentication validator 142 returns the user ID to ads server 118.

In step 606, ads server 118 sends the ad request and the user ID to ads scorer 150.

In step 608, ads scorer 150 selects the ad and a constructs detailed annotation. Ads scorer 150 may select the ad according to a conventional, custom or proprietary process. In an embodiment, the ads scorer 150 retrieves a set of socially-targeted ads that are targeted to the ad request from the ads database. In at least some embodiments, a socially-targeted ad may be an ad that presents one or more pieces of information relevant to the particular user. For example, a socially-targeted ad may be based on ad usage information collected for the user, which may include measured or observed behavior of the user with regard to previous ads that have been presented for display. Additional examples of ad usage information that may form the basis for socially-targeted ads include information about whether or not the user, and/or any other users in the social network of the user (e.g., the user's friends in the social network), has indicated he or she likes an ad, has posted a comment about an ad, has sent a message (e.g., a text message, e-mail message, etc.) about an ad, has visited a web page associated with an ad, and various other information related to user-behavior with regard to particular ads.

After retrieving the set of ads, ads scorer 150 retrieves records from the conversion table 146 and retrieves records from the a recommendation table for constructing detailed annotations for each of the ads. In some embodiments, if an ad has a conversion record associated with the ad, the ad score is boosted over another ad that is not associated with a conversion record but is only associated with a recommendation. In some embodiments, the ad score is boosted (i.e. increased) by the number of conversions of the user's social contacts. The increase may be based on the number of conversions by the user's social contacts for a given ad and the affinity of the social contacts to the user.

In some embodiments, the score for an ad increases in proportion to the number of conversions of social contacts for the entity associated with the ad. In other words, the score for the ad increases proportionally to the number of records in conversion table 146 with a matching entity ID, provided that each of the records is a social contact of the user. In other embodiments, the score for the ad may increase non-linearly, logarithmically, or according to some other function. For example, if an ad is associated with 10 conversion records, the score for the ad will increase in that proportion.

Annotation server 154 may measure the affinity of different contacts in the user's social contacts. In some embodiments, affinity may be measured by how often the user communicates with a social contact in a social network. Such contact may include the number and frequency of sharing content. Ads scorer 150 may construct the detailed annotation by using the social graph table 152 and the conversion table 146. FIG. 7 illustrates, in greater detail, the steps performed by ads scorer 150 to construct the detailed annotation.

In step 610, ads scorer 150 returns the ad ID of the selected ad and the detailed annotation to ads server 118.

In step 612, ads server 118 returns the ad ID and the detailed annotation to client.

In step 614, client receives the ad ID and the detailed annotation, and displays the ad with the detailed annotation. In some embodiments, a photo or avatar of the social contact may be displayed with the annotation. In some embodiments, the photo may be stored in a contacts information table. The annotation server may return the annotation text with avatar links that point to a contact server which serves the avatar images from the contacts information table. In some embodiments, photos or avatars may be displayed in place of the names.

Steps Taken by an Ads Scorer to Construct a Detailed Annotation

FIG. 7 illustrates steps taken by an ads scorer to construct a detailed annotation, according to an embodiment. As illustrated in FIG. 7, ads scorer 150 receives an ad request and user ID in step 702. In response to receiving the ad request, ads scorer 150 selects an ad in step 704. Ads scorer 150 may select the ad according to a conventional, custom or proprietary process. In step 706, ads scorer 150 uses the ad ID of the selected ad to look up an entity ID in the entity ID table. The entity ID table may be, for example, the entity ID table of FIG. 13. In step 708, ads scorer 150 retrieves records from the conversion table 146 that match the entity ID.

In step 710, ads scorer 150 discards, or filters out, retrieved records with user IDs that do not correspond to a contact of the user. In other words, for each retrieved record, if the user ID is not a contact of the user in the social graph, then ads scorer 150 discards the retrieved record. In some embodiments, discarding records is one technique that ads scorer 150 may use to determine which retrieved records are associated with social contacts of the user.

In step 712, ads scorer 150 chooses a record from the remaining retrieved records for the detailed annotation. In some embodiments, ads scorer 150 chooses the record for constructing the detailed annotation according to some conventional, custom, or proprietary process.

In some embodiments, ads scorer 150 chooses the record for constructing the detailed annotation based on comparisons of different scores of affinity between the user associated with the ad request and the social contact associated with the detailed annotation. In some embodiments, the ads scorer 150 measures the affinity of different contacts and chooses a record associated with a social contact that has the greatest affinity. In some embodiments, ad scorer 150 chooses multiple records for constructing the detailed annotation. For example, ads scorer 150 may choose the top three records with social contacts that have the greatest affinities.

In step 714, ads scorer 150 constructs the detailed annotation with the chosen record. For example, an ad request comes from Bob. Using the conversion table 1000 of FIG. 10, ads scorer 150 combines "Alice", "Spelling game", and "purchased" of record 1004 to create a detailed annotation "Alice has purchased Spelling game". For example, record 1010 of the conversion table 1000 indicates that Jill also purchased Spelling game. However, record 1302 of social graph table in FIG. 13 indicates that Jill is not a contact of Bob's, and therefore, in an embodiment, ads scorer 150 does not retrieve a conversion record for Jill, and also does not construct a detailed annotation for Jill. In some embodiments, ads scorer 150 may also generate data representing the link between the constructed detailed annotation and the ad. The detailed annotation may include a user ID for the contact that performed the conversion. In this example, the detailed annotation includes a user ID for Alice. In some embodiments, the detailed annotation includes an identifier of the user ID of the user that performed the conversion action.

In some embodiments, instead of ads scorer 150 constructing a detailed annotation, ads scorer 150 also receives a limited ID cookie from ads server 118, and sends limited ID cookie, ad ID, and a request for detailed annotation to annotation server 154 and receives a detailed annotation from the annotation server 154.

In step 716, ads scorer 150 returns the ad ID and detailed annotation to ads server 118. Ads scorer 150 also sends the data representing the link between the annotation and the ad to ads server 118. Ads scorer 150 sends the detailed annotation to ads server 118, and ads server 118 sends the detailed annotation and data representing the link between the annotation and the ad to the client.

In an embodiment, if ads scorer 150 cannot find any records in conversion table 146 that matches the entity ID, then ads scorer 150 does not construct a detailed annotation, but creates a recommendation annotation. A recommendation annotation is of the form contact+"has recommended this application". Ads scorer 150 creates the recommendation annotation by searching through recommendation table for ad ID. An example of recommendation table is illustrated in FIG. 15. For example, an ads scorer 150 may construct the recommendation annotation "Alice has recommended this application", based on record 1504 of FIG. 15. In an embodiment, if no match is found, then ads scorer 150 does not include any annotation with the ad.

In some embodiments, ads scorer 150 periodically adds and updates the detailed annotations to ads before the requests are received for those ads. Ads scorer 150 may use the join table, which is also updated periodically, for efficient off-line detailed annotation. Such off-line annotation of the ads increases the efficiency of the ads scorer's response to an ad request. In some embodiments, the ads scorer 150 is an integral part of ads server 118, and therefore ads server 118 performs the steps of FIG. 7.

Annotation Server Providing a Detailed Annotation in Response to an Ad Request

Figure 8A:
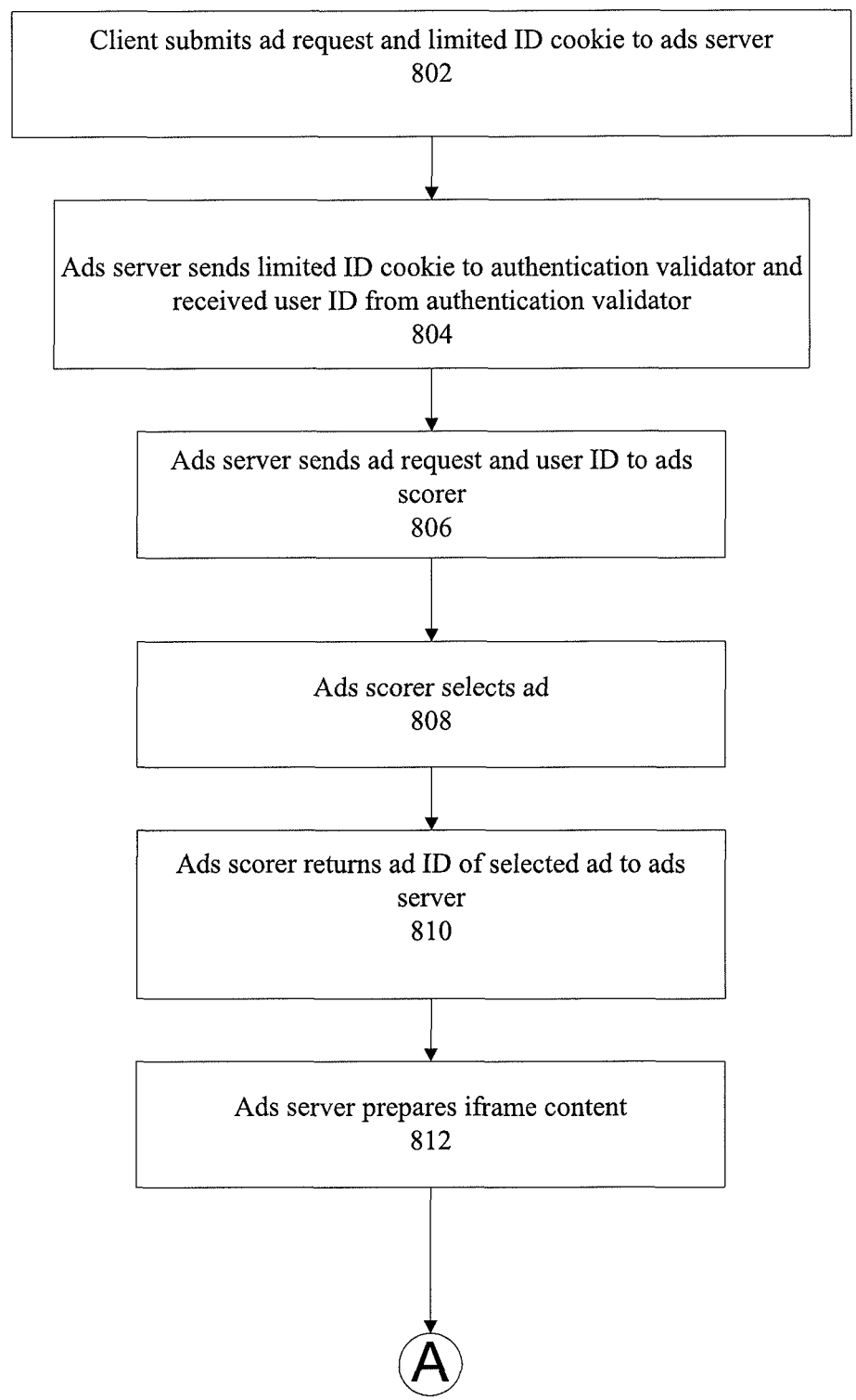
FIG. 8a and FIG. 8b together form a flow diagram illustrating steps that occur in a social annotation system when an annotation server provides a detailed annotation in response to an ad request, according to an embodiment.
Figure 8B:
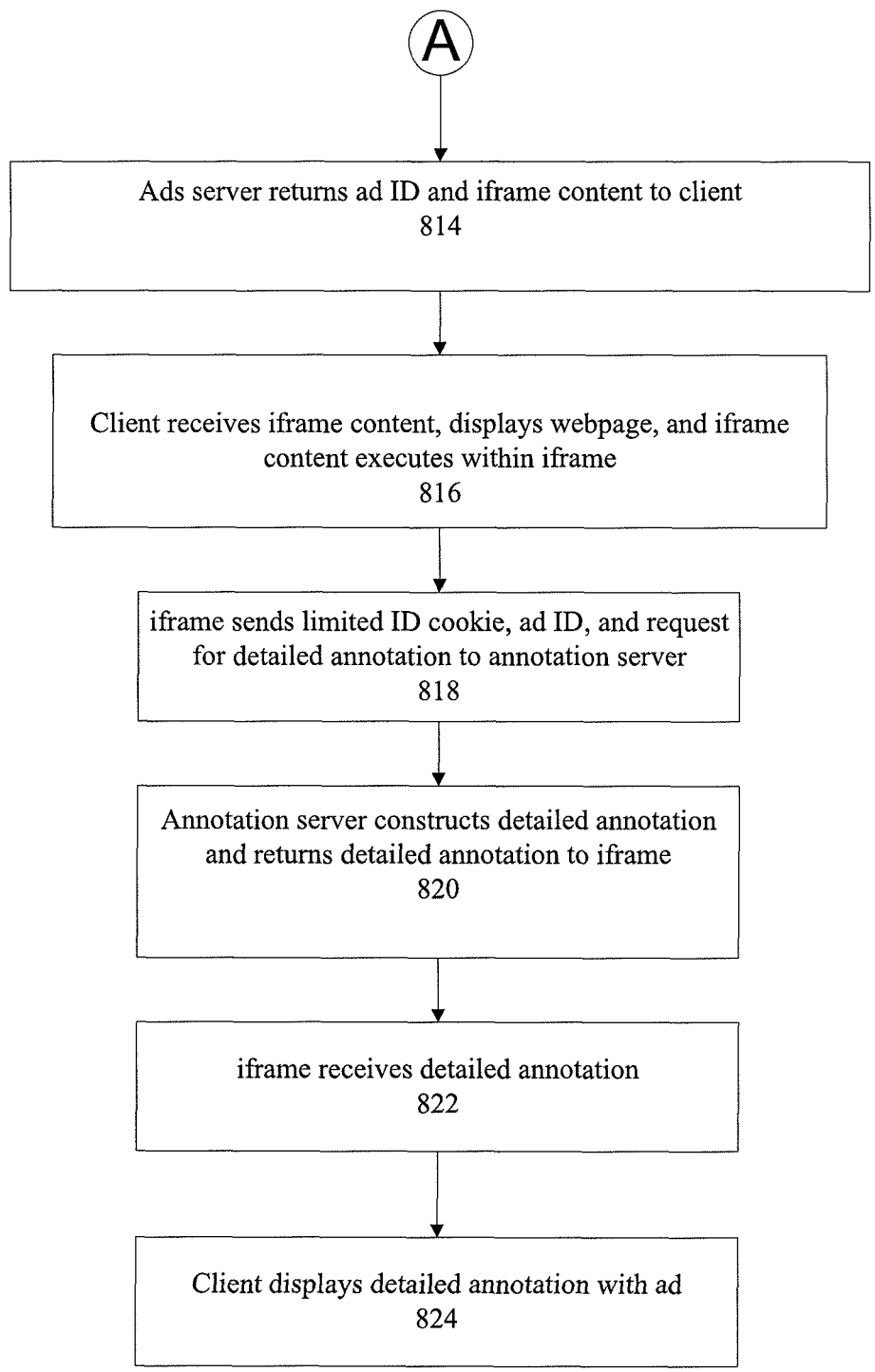

FIG. 8a and FIG. 8b together form a flow diagram illustrating steps that occur in an social annotation system when an annotation server provides a detailed annotation in response to an ad request, according to an embodiment. As illustrated in FIG. 8, client 101 submits ad request and limited ID cookie to ads server 118 in step 802. This ad request is depicted as advertisement requests and limited ID cookies 112 in FIG. 1. For example, client may send the ad request when the web browser 110 displays a new webpage in response to user input. Client may also send the ad request when client ad manager 132 changes the ad that is displayed in the application 106. The limited ID cookie contains the encrypted user ID that identifies the user.

In step 804, ads server 118 sends limited ID cookie to authentication validator 142 and received user ID from authentication validator 142. Authentication validator 142 decrypts the limited ID cookie to obtain the user ID. Authentication validator 142 then verifies that the user ID is a valid user ID. Upon successful verification, authentication validator 142 returns the user ID to ads server 118.

In step 806, ads server 118 sends ad request and user ID to ads scorer 150.

In step 808, ads scorer 150 selects an ad in response to the ad request sent from the client and forwarded by ads server 118. Ads scorer 150 may select the ad according to a conventional, custom or proprietary process. In an embodiment, the ads scorer 150 retrieves a set of socially-targeted ads that are targeted to the ad request from the ads database. In at least some embodiments, a socially-targeted ad may be an ad that presents one or more pieces of information relevant to the particular user. For example, a socially-targeted ad may be based on ad usage information collected for the user, which may include measured or observed behavior of the user with regard to previous ads that have been presented for display. Additional examples of ad usage information that may form the basis for socially-targeted ads include information about whether or not the user, and/or any other users in the social network of the user (e.g., the user's friends in the social network), has indicated he or she likes an ad, has posted a comment about an ad, has sent a message (e.g., a text message, e-mail message, etc.) about an ad, has visited a web page associated with an ad, and various other information related to user-behavior with regard to particular ads.

After retrieving the set of ads, ads scorer 150 retrieves records from the conversion table 146 and retrieves records from a recommendation table for constructing detailed annotations for each of the ads. In some embodiments, if an ad has a conversion record associated with the ad, the ad score is boosted over another ad that does is not associated with a conversion record when but is only associated with a recommendation. In some embodiments, the ad score is boosted (i.e. increased) by the number of conversions of the user's social contacts. The increase may be based on the number of conversions by the user's social contacts for a given ad and the affinity of the social contacts to the user.

In some embodiments, the score for an ad increases in proportion to the number of conversions of social contacts for the entity associated with the ad. In other words, the score for the ad increases proportionally to the number of records in conversion table 146 with a matching entity ID, provided that each of the records is a social contact of the user. In other embodiments, the score for the ad may increase non-linearly, logarithmically, or according to some other function. For example, if an ad is associated with 10 conversion records, the score for the ad will increase in that proportion.

Figure 9:
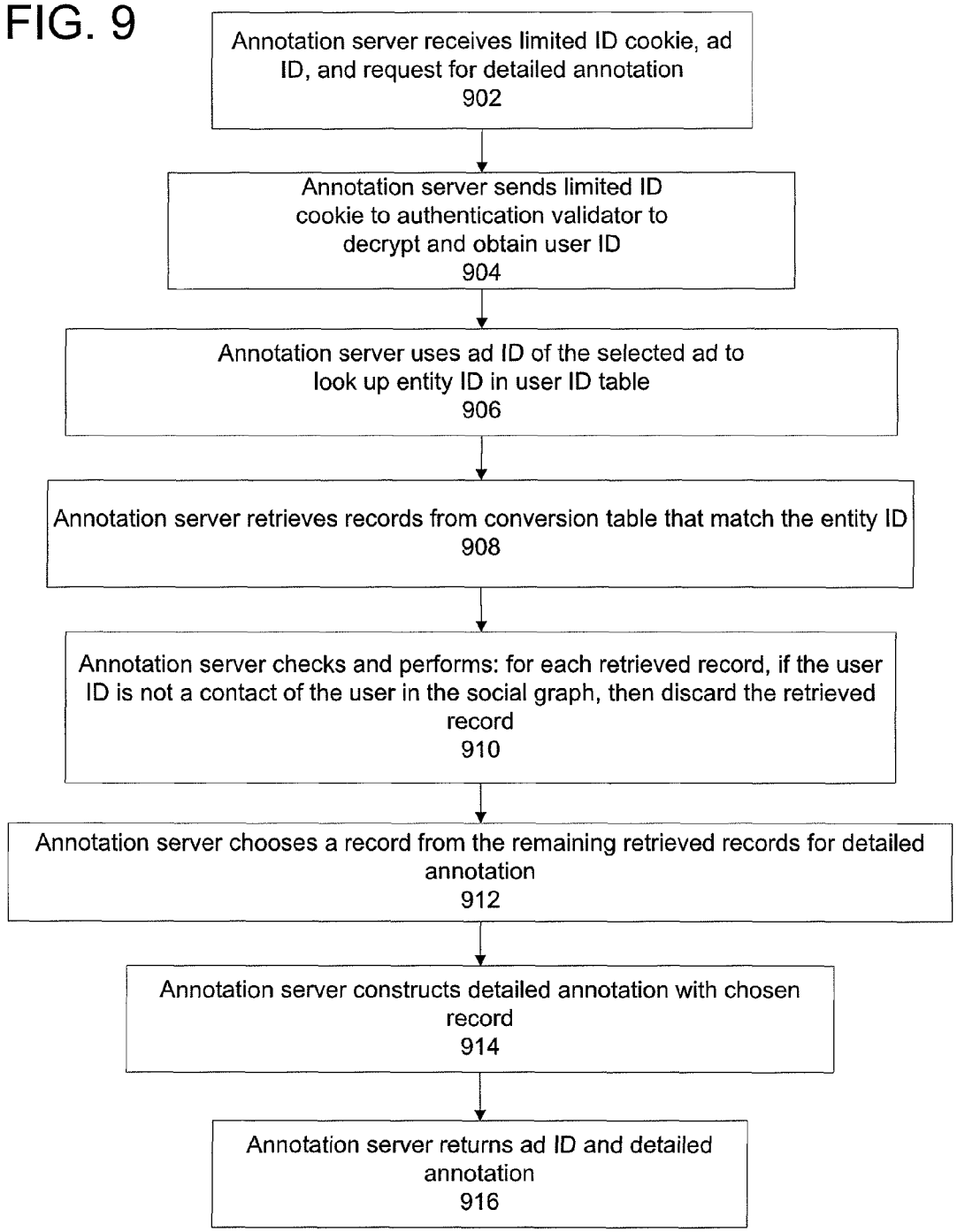
FIG. 9 illustrates steps taken by an annotation server to construct a detailed annotation, according to an embodiment.

Annotation server 154 may measure the affinity of different contacts in the user's social contacts. In some embodiments, affinity may be measured by how often the user communicates with a social contact in a social network. Such contact may include the number and frequency of sharing content. Annotation server 154 may construct the detailed annotation by using the social graph table 152 and the conversion table 146. FIG. 9 illustrates, in greater detail, the steps performed by annotation server 154 to construct the detailed annotation.

In step 810, ads scorer 150 returns ad ID of selected ad to ads server 118.

In step 812, ads server 118 prepares iframe content for iframe 134. The iframe content is displayed on the client as a document within an inline frame and code within the iframe may execute independently and in parallel with the rest of the web page or application displayed on the client.

In step 814, ads server 118 returns the ad ID and the iframe content to client.

In step 816, client receives iframe content, displays webpage, and the iframe content executes within the iframe. In step 818, iframe 134 sends limited ID cookie, ad ID, and request for detailed annotation to annotation server 154.

In step 820, annotation server 154 constructs a detailed annotation and returns the detailed annotation to iframe 134. FIG. 9 illustrates, in greater detail, the steps performed by annotation server 154 to construct the detailed annotation.

In step 822, iframe 134 receives the detailed annotation.

In step 824, client displays the detailed annotation with the ad. The iframe 134 on the client displays the detailed annotation over or with the ad. In some embodiments, a photo or avatar of the social contact may be displayed with the annotation. In some embodiments, the photo may be stored in a contacts information table. The annotation server may return the annotation text with avatar links that point to a contact server which serves the avatar images from the contacts information table. In some embodiments, photos or avatars may be displayed in place of the names.

Steps Taken by an Annotation Server to Construct a Detailed Annotation

FIG. 9 illustrates steps taken by an annotation server to construct a detailed annotation, according to an embodiment. As illustrated in FIG. 9, annotation server 154 receives limited ID cookie, ad ID, and request for detailed annotation, in step 902.

In step 904, annotation server 154 sends the limited ID cookie to authentication validator 142 to decrypt and obtain a user ID. Authentication validator 142 decrypts the limited ID cookie to obtain the user ID. Authentication validator 142 then verifies that the user ID is a valid user ID. Upon successful verification, authentication validator 142 returns the user ID to annotation server 154.

In step 906, annotation server 154 uses the ad ID of the selected ad to look up an entity ID in the entity ID table. The entity ID table may be, for example, the entity ID table of FIG. 14. In step 908, annotation server 154 retrieves records from the conversion table 146 that match the entity ID.

In step 910, annotation server 154 discards, or filters out, retrieved records with user IDs that do not correspond to a contact of the user. In other words, for each retrieved record, if the user ID is not a contact of the user in the social graph, then annotation server 154 discards the retrieved record. In some embodiments, discarding records is one technique that ads scorer 150 may use to determine which retrieved records are associated with social contacts of the user.

In step 912, annotation server 154 chooses a record from the remaining retrieved records for the detailed annotation. In some embodiments, annotation server 154 chooses the record for constructing the detailed annotation according to some conventional, custom or proprietary process. In some embodiments, annotation server 154 chooses the record for constructing the detailed annotation based on comparisons of different scores of affinity between the user associated with the ad request and the social contact associated with the detailed annotation. In some embodiments, the annotation server 154 measures the affinity of different contacts with respect to the user and chooses a record associated with a social contact that has the greatest affinity. In some embodiments, ad scorer 150 chooses multiple records for constructing the detailed annotation. For example, ads scorer 150 may choose the top three records with social contacts that have the greatest affinities.

In step 914, annotation server 154 constructs the detailed annotation with the chosen record. For example, an ad request comes from Bob. Using the conversion table 1000 of FIG. 10, annotation server 154 combines "Alice", "Spelling game", and "purchased" of record 1004 to create a detailed annotation "Alice has purchased Spelling game". For example, record 1010 of the conversion table 1000 indicates that Jill also purchased Spelling game. However, record 1302 of social graph table in FIG. 13 indicates that Jill is not a contact of Bob's, and therefore, in an embodiment, ads scorer 150 does not retrieve a conversion record for Jill, and also does not construct a detailed annotation for Jill. The detailed annotation may include a user ID for the contact that performed the conversion. In this example, the detailed annotation includes a user ID for Alice. In some embodiments, the detailed annotation includes an identifier of the user ID of the user that performed the conversion action. In step 916, annotation server 154 returns the ad ID and detailed annotation to iframe 134. Iframe 134 receives the detailed annotation and displays the detailed annotation over or with the ad.

In an embodiment, if annotation server 154 cannot find any records in conversion table 146 that matches the entity ID, then annotation server 154 does not construct a detailed annotation, but creates a recommendation annotation. A recommendation annotation is of the form contact+"has recommended this application". Annotation server 154 creates the recommendation annotation by searching through recommendation table for ad ID. For example, annotation server 154 may construct the recommendation annotation "Alice has recommended this application", based on record 1504 of FIG. 15. In an embodiment, if no match is found, then annotation server 154 does not include any annotation with the ad. In some embodiments, annotation server 154 periodically adds and updates the detailed annotations to ads before the requests are received for those ads. For example, while not processing any ad request, annotation server 154 may compute a detailed annotation for each ad. Annotation server 154 may use the join table, which is also updated periodically, for efficient off-line detailed annotation. Such off-line annotation of the ads increases the efficiency of the ads scorer's response to an ad request. In some embodiments, the annotation server 154 is an integral part of ads server 118, and therefore ads server 118 performs the steps of FIG. 9.

Conversion Table

FIG. 10 illustrates a conversion table, according to an embodiment. The example conversion table of FIG. 10 includes records 1002, 1004, 1006, 1008, and 1010. The entity's name is displayed in place of the entity ID in FIG. 10 for simplicity of illustration. In an actual implementation, in some embodiments, the entity ID of FIG. 10 would be a unique numerical value that represents an entity.

According to one embodiment, conversion table 1000 includes an entity ID column 1012, a user ID column 1014, and a conversion action column 1016. In some embodiments, conversion table 1000 also includes a timestamp column 1018, and a location column 1020. Each record of conversion table 1000 contains a user ID and represents a conversion performed by the user or social contact identified by the user ID. For example, according to record 1008 of conversion table 1000, Bob purchased a spreadsheet application at time TS4, at location LOC4. Other examples of conversions include renting a movie on a website, buying shampoo through an online marketplace, or donating money. Ads scorer 150 or annotation server 154 uses the conversion records of the conversion table and the social contact records of the social graph table 152 to construct detailed annotations.

Ad Request Log

FIG. 11 illustrates an ad request log, according to an embodiment. Ad request log 1100 is an example of ad request log 148. As illustrated in FIG. 11, ad request log 1100 has at least two columns, which are an ad request ID column 1112, and a limited ID cookie column 1114. The illustrated ad request log 1100 has ad request entries 1102, 1104, 1106, 1108, and 1110. For simplicity of illustration, the name of the person that is assigned the limited ID cookie ("LIC") listed in each ad request log entry is listed in parentheses. The entries in the limited ID cookie column that begin with "LIC" each represent the limited ID cookie data for the associated person. For example, John has a limited ID cookie of "LIC1".

In an embodiment, each of the ad request entries is written by ads server 118. Batch handler 144 uses the ad request log entries to obtain the limited ID cookies. In some embodiments, batch handler 144 matches up the ad request ID in the ad request log 1100 to the ad request ID in the conversion log 140 in order to create conversion records for entry into the conversion table 146. The conversion records in the conversion table 146 are used with social contact records in the social graph table 152 to produce detailed annotations.

Conversion Log without Limited ID Cookie

FIG. 12 illustrates a conversion log with no limited ID cookie, according to an embodiment. In an embodiment, conversion log 1200 is an example of conversion log 140. In the embodiment illustrated in FIG. 12, conversion log 1200 includes an ad request ID column, but without a limited ID cookie column.

In an embodiment, conversion log 1200 has three columns, which are an entity ID column 1212, an ad request ID column 1214, and a conversion action column 1214. In some embodiments, conversion log 1200 also has a timestamp column and a location column.

The example conversion log 1200 of FIG. 12 includes log entries 1202, 1204, 1206, 1208, and 1210. In some embodiments, as part of each log entry entered into the conversion log, batch handler 144 may also enter a timestamp and location ID. Batch handler 144 may extract the timestamp and location from the conversion log 1200. The conversion log entry that is entered into conversion log 1200, in combination with ad request log entry 1206, may indicate, for example, that Alice has purchased the Spelling game application in response to an advertisement for the application.

In an embodiment, each of the conversion log entries is written by conversion management server 138. Batch handler 144 uses the conversion log entries to obtain the data regarding each conversion. Batch handler 144 matches up the ad request ID in the ad request log 1100 to the ad request ID in the conversion log 1200 (the conversion log without limited ID cookies) in order to create conversion records for entry into the conversion table 146. The conversion records in the conversion table 146 are used with social contact records in the social graph table 152 to produce detailed annotations.

Social Graph Table

FIG. 13 illustrates a social graph table, according to an embodiment. As illustrated in FIG. 13, social graph table 1300 includes a name column 1312 and one or more contact columns 1314. For each record 1302, 1304, 1306, 1308, and 1310, the contact columns indicate social contacts of the user identified in the name column. In actual implementation, in some embodiments, the name column is replaced with a user ID column. Each user or social contact is assigned a unique user ID. Also, in actual implementation, in some embodiments, the names of the contacts are each replaced with a user ID.

Entity ID Table

FIG. 14 illustrates an entity ID table, according to an embodiment. The example entity ID table of FIG. 14 includes records 1402, 1404, 1406, 1408, and 1410. As illustrated in FIG. 14, the example entity ID table has an ad ID column 1412 and an entity ID column 1414. Each entity is represented by a unique entity ID within the system of FIG. 1. The entity's name is displayed in place of an entity ID value in FIG. 14 for simplicity of illustration. In an actual implementation, in some embodiments, the entity ID of FIG. 14 would be a unique numerical value that represents an entity.

In an embodiment, ads scorer 150 or annotation server 154 may use entity ID table 1400 to retrieve the entity ID corresponding to an ad ID. An entity may be associated with more than one ad ID. Ads scorer 150 or annotation server 154 may use the entity ID retrieved from entity ID table 1400 to search through the conversion table 146 for records of conversions performed by contacts of the user. Ads scorer 150 or annotation server 154 may use the conversion records to construct detailed annotations.

In an embodiment, the records of the entity ID table may be populated using one of two possible methods or a mix of the two methods. According to one method, conversion management server 138 may enter the ad ID and entity ID values into the entity ID table. In some embodiments, the ad ID is a number generated by an ads frontend when the ad is uploaded by an advertiser. In some embodiments, the entity ID may be generated by the annotation server or an entity server that enters the mapping of the entity ID to the ad ID to the entity ID table. According to another method, an advertiser may submit an ad ID and entity ID values to batch handler 144 for entry into the entity ID table.

Recommendation Table

FIG. 15 illustrates a recommendation table, according to an embodiment. The illustrated example recommendation table of FIG. 15 contains records 1502, 1504, 1506, 1508, and 1510 that indicate which users have recommended which advertisements. A "Who Recommended" column 1514 in the recommendation table lists a user ID that indicates the person that has recommended the ad. For simplicity of illustration, in FIG. 15, the name of the user is illustrated instead of the user ID. An Ad ID column 1512 in the recommendation table lists an ad ID that indicates the ad recommended by the person. Annotation server 154 retrieves the records from recommendation table 1500 to construct an annotation indicating that a user has recommended an ad. For example, annotation server 154 may retrieve records 1508 and 1510 from FIG. 15 which indicate that Bob has recommended ad1 and that Paul has recommended ad5.

In an embodiment, if ads scorer 150 cannot find any records in conversion table 146 that matches the entity ID, then ads scorer 150 does not construct a detailed annotation, but creates a recommendation annotation. A recommendation annotation is of the form contact+"has recommended this application". Ads scorer 150 creates the recommendation annotation by searching through recommendation table for an ad ID. Ads scorer 150 selects the ad ID from among the matches found in recommendation table. For example, based on record 1504 of FIG. 15, ads scorer 150 may construct the recommendation annotation "Alice has recommended this application", which may be displayed when the ad with ad ID value of ad4 is displayed. In an embodiment, if no match is found, then ads scorer 150 does not include any annotation with the ad.

In an embodiment, if annotation server 154 cannot find any records in conversion table 146 that matches the entity ID, then annotation server 154 does not construct a detailed annotation, but creates a recommendation annotation. A recommendation annotation is of the form contact+"has recommended this application". Annotation server 154 creates the recommendation annotation by searching through recommendation table for an ad ID. Annotation server 154 selects the ad ID from among the matches found in recommendation table. For example, based on record 1504 of FIG. 15, annotation server 154 may construct the recommendation annotation "Alice has recommended this application", which may be displayed when the ad with ad ID value of ad4 is displayed. In an embodiment, if no match is found, then annotation server 154 does not include any annotation with the ad.

Conversion Log with Limited ID Cookie

FIG. 16 illustrates a conversion log with limited ID cookies, according to an embodiment. In an embodiment, conversion log 1600 is an example of conversion log 140. In the embodiment illustrated in FIG. 16, conversion log 1600 includes a limited ID cookie column.

In an embodiment, conversion log 1600 has three columns, which are an entity ID column 1612, a limited ID cookie column 1614, and a conversion action column 1614. In some embodiments, the ad request ID column is optionally present in conversion log 1600. In some embodiments, conversion log 1600 also has a timestamp column and a location column.

The example conversion log 1600 of FIG. 16 includes log entries 1602, 1604, 1606, 1608, and 1610. In some embodiments, as part of each log entry entered into the conversion log, batch handler 144 may also enter a timestamp and location ID. Batch handler 144 may extract the timestamp and location from the conversion log 1600. The conversion log entry that is entered into conversion log 1600 may indicate, for example, that Alice has purchased the Spelling game application in response to an advertisement for the application.

In an embodiment, each of the conversion log entries is written by conversion management server 138. Batch handler 144 uses the conversion log entries to obtain the data regarding each conversion. Batch handler 144 creates conversion records for entry into the conversion table 146. The conversion records in the conversion table 146 are used with social contact records in the social graph table 152 to produce detailed annotations.

Example Embodiments

Figure 17:
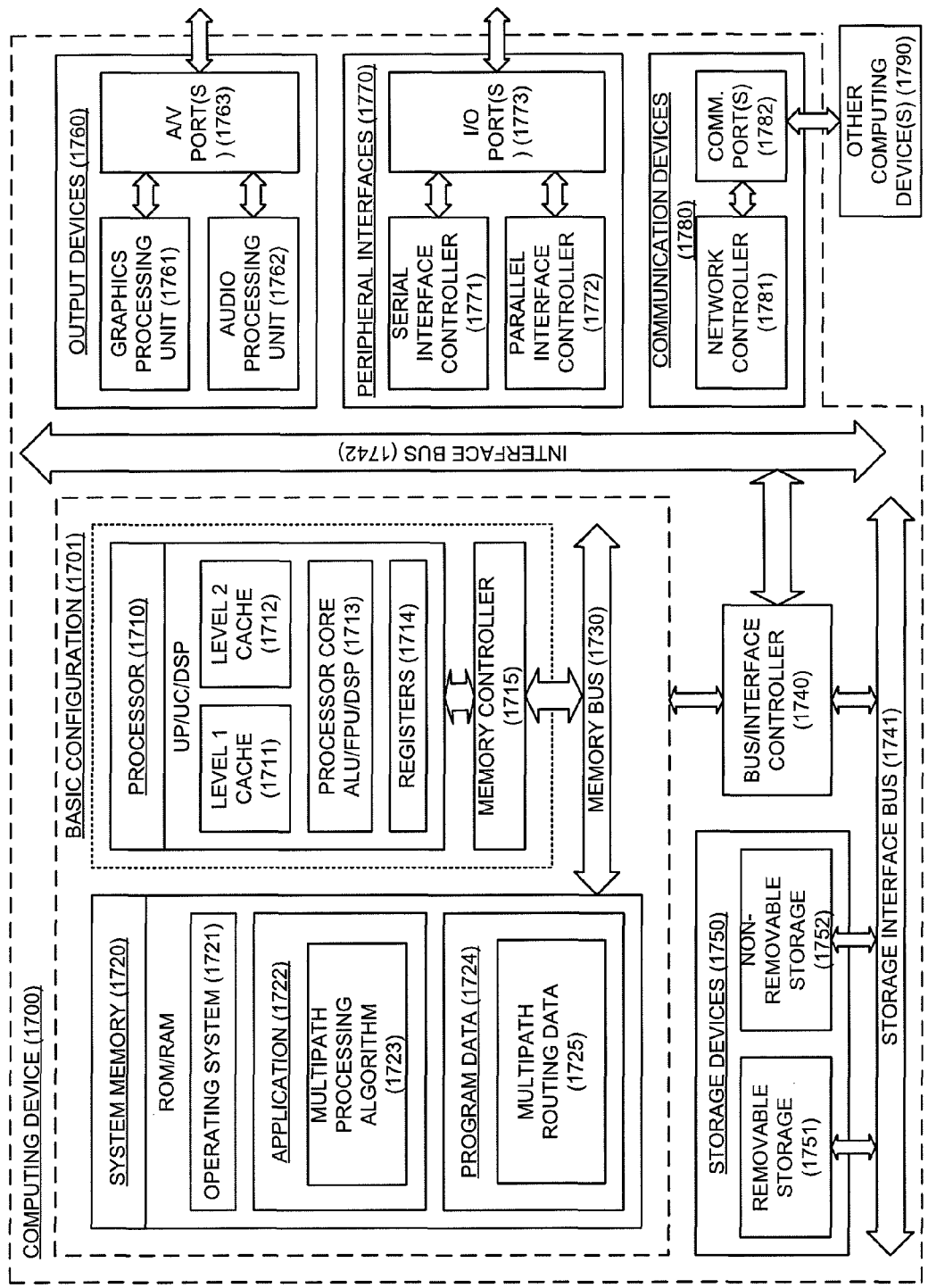
FIG. 17 is a block diagram illustrating another exemplary system upon which embodiments may be implemented.

FIG. 17 is a block diagram illustrating another exemplary system 1700 upon which embodiments may be implemented. For example, conversion module 136, conversion management server 138, batch handler 144, annotation server 154, ads scorer 150, authentication validator 142, client 101, and ads server 118 may be implemented with system 1700. In a very basic configuration 1701, computing device 1700 typically includes one or more processors 1710 and system memory 1720. A memory bus 1730 can be used for communicating between the processor 1710 and the system memory 1720.

Depending on the desired configuration, processor 1710 can be of any type including but not limited to a microprocessor (µP), a microcontroller (µC), a digital signal processor (DSP), or any combination thereof. Processor 1710 can include one more levels of caching, such as a level one cache 1711 and a level two cache 1712, a processor core 1713, and registers 1714. The processor core 1713 can include an arithmetic logic unit (ALU), a floating point unit (FPU), a digital signal processing core (DSP Core), or any combination thereof. A memory controller 1715 can also be used with the processor 1710, or in some implementations the memory controller 1715 can be an internal part of the processor 1710.

Depending on the desired configuration, the system memory 1720 can be of any type including but not limited to volatile memory (such as RAM), non-volatile memory (such as ROM, flash memory, etc.) or any combination thereof. System memory 1720 typically includes an operating system 1721, one or more applications 1722, and program data 1724. In some embodiments, application 1722 can be arranged to operate with program data 1724 on an operating system 1721. This described basic configuration is illustrated in FIG. 17 by those components within dashed line 1701.

Computing device 1700 can have additional features or functionality, and additional interfaces to facilitate communications between the basic configuration 1701 and any required devices and interfaces. For example, a bus/interface controller 1740 can be used to facilitate communications between the basic configuration 1701 and one or more data storage devices 1750 via a storage interface bus 1741. The data storage devices 1750 can be removable storage devices 1751, non-removable storage devices 1752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1720, removable storage 1751 and non-removable storage 1752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media can be part of device 1700.

Computing device 1700 can also include an interface bus 1742 for facilitating communication from various interface devices (e.g., output interfaces, peripheral interfaces, and communication interfaces) to the basic configuration 1701 via the bus/interface controller 1740. Example output devices 1760 include a graphics processing unit 1761 and an audio processing unit 1762, which can be configured to communicate to various external devices such as a display or speakers via one or more A/V ports 1763. Example peripheral interfaces 1770 include a serial interface controller 1771 or a parallel interface controller 1772, which can be configured to communicate with external devices such as input devices (e.g., keyboard, mouse, pen, voice input device, touch input device, etc.) or other peripheral devices (e.g., printer, scanner, etc.) via one or more I/O ports 1773. An example communication device 1780 includes a network controller 1781, which can be arranged to facilitate communications with one or more other computing devices 1790 over a network communication via one or more communication ports 1782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

The invention claimed is:

1. A method performed by one or more data processing apparatuses, comprising:

receiving data indicating that a first user performed a conversion action in response to a first ad, wherein the received data includes an ad ID for the first ad and a first limited ID cookie that only identifies an encrypted user ID for the first user;

decrypting the first limited ID cookie to obtain the user ID of the first user;

creating a conversion record that includes the user ID for the first user an entity ID for an entity associated with the first ad, and the conversion action performed by the first user;

receiving an ad request over a network from a client device of a second user, the ad request including a second limited ID cookie that only identifies an encrypted user ID for the second user;

decrypting the second limited ID cookie to obtain the user ID of the second user;

determining that the second user is a social contact of the first user in a social network based on the user ID of the second user and the user ID of the first user;

in response to receiving the ad request, selecting a second ad with an ad ID;

determining, based on the ad ID of the second ad, that the second ad is associated with a same entity as the first ad that is associated with the conversion action performed by the first user;

retrieving conversion records containing the entity ID for the same entity, wherein the retrieved conversion records include at least the created conversion record;

constructing a detailed annotation for display in the second ad based on the created conversion record that contains the user ID for the first user, wherein the detailed annotation identifies (i) the user ID of the first user, (ii) the conversion action performed by the first user, and (iii) the same entity; and sending the detailed annotation over the network to the client device in a format suitable for presentation on a display of the client device in conjunction with the selected ad.

2. The method of claim 1, wherein sending the detailed annotation to the client device further comprises sending the detailed annotation to an iframe on the client device.

3. The method of claim 1, wherein the detailed annotation is constructed based on the created conversion record and at least one other conversion record.

4. The method of claim 1, further comprising selecting the created conversion record, for constructing the detailed annotation, from the retrieved conversion records containing the entity ID for the entity associated with the ad.

5. The method of claim 4, wherein the created conversion record is selected from the retrieved conversion records based on an affinity score between the first user and the second user.

6. The method of claim 1, further comprising boosting an ad score of the ad for which the first user performed the conversion action.

7. The method of claim 1, further comprising:
receiving a request for an annotation from the client device; and
sending the constructed detailed annotation to the client device in response to receiving the annotation request.

8. The method of claim 1, further comprising:
writing a log entry with a limited ID cookie, the limited ID cookie containing the encrypted user ID for the first user; and
writing another log entry with a second ad ID and the conversion action performed by the first user.

9. A system comprising:
one or more computers;
a computer-readable medium coupled to the one or more computers having instructions stored thereon which, when executed by the one or more computers, causes the one or more computers to perform operations comprising:
receiving data indicating that a first user performed a conversion action in response to a first ad, wherein the received data includes an ad ID for the first ad and a first limited ID cookie that only identifies an encrypted user ID for the first user;
decrypting the first limited ID cookie to obtain the user ID of the first user;
creating a conversion record that includes the user ID for the first user an entity ID for an entity associated with the first ad, and the conversion action performed by the first user;
receiving an ad request over a network from a client device of a second user, the ad request including a second limited ID cookie that only identifies an encrypted user ID for the second user;
decrypting the second limited ID cookie to obtain the user ID of the second user;
determining that the second user is a social contact of the first user in a social network based on the user ID of the second user and the user ID of the first user;
in response to receiving the ad request, selecting a second ad with an ad ID;
determining, based on the ad ID of the second ad, that the second ad is associated with a same entity as the first ad that is associated with the conversion action performed by the first user;
retrieving conversion records containing the entity ID for the same entity, wherein the retrieved conversion records include at least the created conversion record;
constructing a detailed annotation for display in the second ad based on the created conversion record that contains the user ID for the first user, wherein the detailed annotation identifies (i) the user ID of the first user, (ii) the conversion action performed by the first user, and (iii) the same entity; and
sending the detailed annotation over the network to the client device in a format suitable for presentation on a display of the client device in conjunction with the selected ad.

10. The system of claim 9, wherein sending the detailed annotation to said client device further comprises sending the detailed annotation to an iframe on the client device.

11. The system of claim 9, wherein the detailed annotation is constructed based on the created conversion record and at least one other conversion record.

12. The system of claim 9, wherein the computer-readable medium has further instructions stored thereon which, when executed by the one or more computers, causes the one or more computers to perform further operations comprising:
electing the created conversion record, for constructing the detailed annotation, from the retrieved conversion records containing the entity ID for the entity associated with the ad.

13. The system of claim 12, wherein the created conversion record is selected from the retrieved conversion records based on an affinity score between the first user and the second user.

14. The system of claim 9, wherein the computer-readable medium has further instructions stored thereon which, when executed by the one or more computers, causes the one or more computers to perform further operations comprising:
boosting an ad score of the ad for which the first user performed the conversion action.

15. The system of claim 9, wherein the computer-readable medium has further instructions stored thereon which, when executed by the one or more computers, causes the one or more computers to perform further operations comprising:
receiving a request for an annotation from the client device; and
sending the constructed detailed annotation to the client device in response to receiving the annotation request.

16. The system of claim 9, wherein the computer-readable medium has further instructions stored thereon which, when executed by the one or more computers, causes the one or more computers to perform further operations comprising:

writing a log entry with a limited ID cookie, the limited ID cookie containing the encrypted user ID for the first user; and writing another log entry with a second ad ID and the conversion action performed by the first user.

17. A computer-readable storage medium encoded with a computer program comprising instructions that, when executed, operate to cause a computer to perform operations comprising:

receiving data indicating that a first user performed a conversion action in response to a first ad, wherein the received data includes an ad ID for the first ad and a first limited ID cookie that only identifies an encrypted user ID for the first user;

decrypting the first limited ID cookie to obtain the user ID of the first user;

creating a conversion record that includes the user ID for the first user an entity ID for an entity associated with the first ad, and the conversion action performed by the first user;

receiving an ad request over a network from a client device of a second user, the ad request including a second limited ID cookie that only identifies an encrypted user ID for the second user;

decrypting the second limited ID cookie to obtain the user ID of the second user;

determining that the second user is a social contact of the first user in a social network based on the user ID of the second user and the user ID of the first user;

in response to receiving the ad request, selecting a second ad with an ad ID;

determining, based on the ad ID of the second ad, that the second ad is associated with a same entity as the first ad that is associated with the conversion action performed by the first user;

retrieving conversion records containing the entity ID for the same entity, wherein the retrieved conversion records include at least the created conversion record;

constructing a detailed annotation for display in the second ad based on the created conversion record that contains the user ID for the first user, wherein the detailed annotation identifies (i) the user ID of the first user, (ii) the conversion action performed by the first user, and (iii) the same entity; and sending the detailed annotation over the network to the client device in a format suitable for presentation on a display of the client device in conjunction with the selected ad.

18. The computer-readable storage medium of claim 17, wherein sending the detailed annotation to the client device further comprises sending the detailed annotation to an iframe on the client device.

19. The computer-readable storage medium of claim 17, wherein the detailed annotation is constructed based on the created conversion record and at least one other conversion record.

20. The computer-readable storage medium of claim 17, the computer program further comprising instructions that, when executed, operate to cause the computer to perform further operations comprising:

electing the created conversion record, for constructing the detailed annotation, from the retrieved conversion records containing the entity ID for the entity associated with the ad.

21. The computer-readable storage medium of claim 20, wherein the created conversion record is selected from the retrieved conversion records based on an affinity score between the first user and the second user.

22. The computer-readable storage medium of claim 17, the computer program further comprising instructions that, when executed, operate to cause the computer to perform further operations comprising:

boosting an ad score of the ad for which the first user performed the conversion action.

23. The computer-readable storage medium of claim 17, the computer program further comprising instructions that, when executed, operate to cause the computer to perform further operations comprising:

receiving a request for an annotation from the client device; and sending the constructed detailed annotation to the client device in response to receiving the annotation request.

24. The computer-readable storage medium of claim 17, the computer program further comprising instructions that, when executed, operate to cause the computer to perform further operations comprising:

writing a log entry with a limited ID cookie, the limited ID cookie containing the encrypted user ID for the first user; and writing another log entry with a second ad ID and the conversion action performed by the first user.

25. The method of claim 1, wherein the data indicating that the first user performed the conversion action is received from an application executing outside of a web browser.

26. The system of claim 9, wherein the data indicating that the first user performed the conversion action is received from an application executing outside of a web browser.

27. The computer-readable storage medium of claim 17, wherein the data indicating that the first user performed the conversion action is received from an application executing outside of a web browser.

* * * * *